United States Patent
Kinoshita et al.

(10) Patent No.: US 9,497,313 B2
(45) Date of Patent: Nov. 15, 2016

(54) USER INTERFACE GENERATION APPARATUS

(75) Inventors: Kenta Kinoshita, Yokohama (JP); Kazuhiro Yamamoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 1786 days.

(21) Appl. No.: 12/935,376

(22) PCT Filed: Mar. 26, 2009

(86) PCT No.: PCT/JP2009/056199
§ 371 (c)(1),
(2), (4) Date: Sep. 29, 2010

(87) PCT Pub. No.: WO2009/123028
PCT Pub. Date: Oct. 8, 2009

(65) Prior Publication Data
US 2011/0035706 A1 Feb. 10, 2011

(30) Foreign Application Priority Data
Apr. 1, 2008 (JP) ................................. 2008-095558

(51) Int. Cl.
*H04M 1/725* (2006.01)
*G06F 9/44* (2006.01)
*G06F 3/0481* (2013.01)

(52) U.S. Cl.
CPC ............ *H04M 1/72583* (2013.01); *G06F 8/38* (2013.01); *H04M 1/72533* (2013.01); *G06F 3/04817* (2013.01); *H04M 2250/22* (2013.01)

(58) Field of Classification Search
CPC ............ G06F 3/04817; G06F 3/0482; G06F 3/0481; H04M 1/72583

USPC ................................................ 715/835; 3/835
See application file for complete search history.

(56) References Cited

U.S. PATENT DOCUMENTS

| 6,211,870 B1* | 4/2001 | Foster ................. G06F 3/04886 348/E5.103 |
| 2001/0013823 A1 | 8/2001 | Hatakeyama et al. |
| 2004/0090469 A1* | 5/2004 | Moon ................... G06F 3/0485 715/846 |

(Continued)

FOREIGN PATENT DOCUMENTS

| JP | A-2000-20295 | 1/2000 |
| JP | A-2000-194538 | 7/2000 |

(Continued)

OTHER PUBLICATIONS

Shelley O'Hara et al., "Absolute Beginner's Guide to Microsoft Windows Vista," chapter 1, 8 pages.*

(Continued)

*Primary Examiner* — Sherrod Keaton
(74) *Attorney, Agent, or Firm* — Oliff PLC

(57) ABSTRACT

A mobile phone includes a generation unit for generating a user interface for instructing an execution unit to execute a predetermined function based on an application program, a memory unit for storing a definition file including information defining an object of the user interface, and a selection screen generation unit for generating a screen to receive selection of the object. The selection screen generation unit generates the selection screen based on object definition information of a plurality of user interfaces instructed. The generation unit generates a definition file including definition information of selected objects and also generates a compound user interface based on the definition file.

13 Claims, 20 Drawing Sheets

(56) References Cited

U.S. PATENT DOCUMENTS

2008/0010306 A1    1/2008   Nagai et al.
2009/0161027 A1*   6/2009   Hardacker ............. G08C 17/02
                                                          348/734
2009/0239587 A1    9/2009   Negron et al.

FOREIGN PATENT DOCUMENTS

| JP | A-2001-36652  | 2/2001 |
| JP | A-2002-278666 | 9/2002 |
| JP | A-2008-9960   | 1/2008 |

OTHER PUBLICATIONS

Alyce Watson, "Desktop Shell Demo," 2007, 4 pages.*
Microsoft Press, "Microsoft Windows User Experience," 1999, pp. 242-243.*
Plus2Net, "Counting the characters dynamically inside a textarea and setting a limit," Feb. 10, 2007, 2 pages ("Plus2Net").*
Oct. 1, 2013 Office Action issued in Japanese Patent Application No. 2010-505806.
Statement of Relevance of Non-English References Pursuant to 37 CFR 1.98(a)(3)(i).
International Search Report dated Apr. 28, 2009 in International Application No. PCT/JP2009/056199 (with translation).
Jan. 12, 2015 Office Action issued in U.S. Appl. No. 12/935,709.
Sep. 28, 2012 Office Action issued in Korean Patent Application No. 10-2010-7021930 (with translation).
May 23, 2013 Office Action issued in U.S. Appl. No. 12/935,709.
Jan. 17, 2012 Office Action issued in Korean Patent Application No. 10-2010-7021930 (with translation).
Office Action issued in Japanese Patent Application No. 2010-505806 dated Jan. 29, 2013 (with translation).

* cited by examiner

FIG.2

| COMPOUND UI DEFINITION FILE NAME | RELEVANT APPLICATION |
|---|---|
| comp1.uiml | airconremoconapp, tvremoconapp |
| comp2.uiml | airconremoconapp, lightremoconapp, tvremoconapp |
| ... | ... |

55a

FIG. 6
(A) 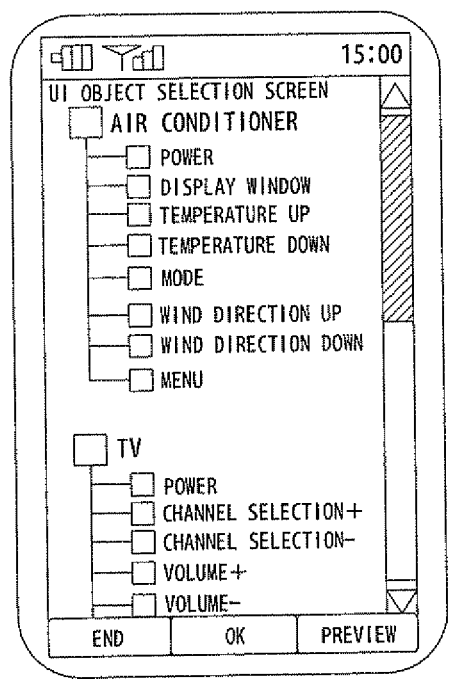
(B) 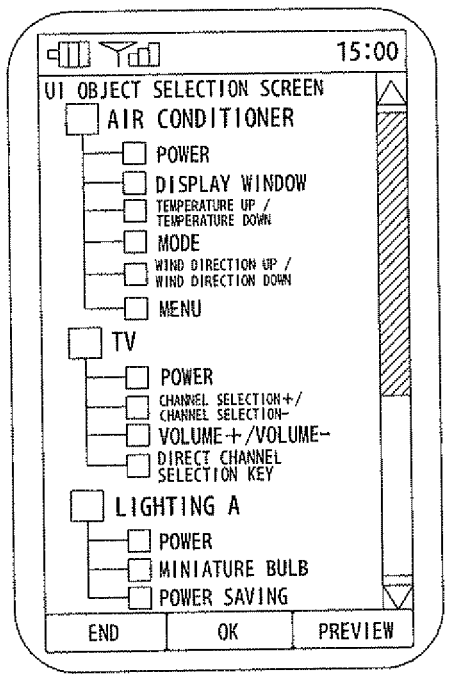
(C) 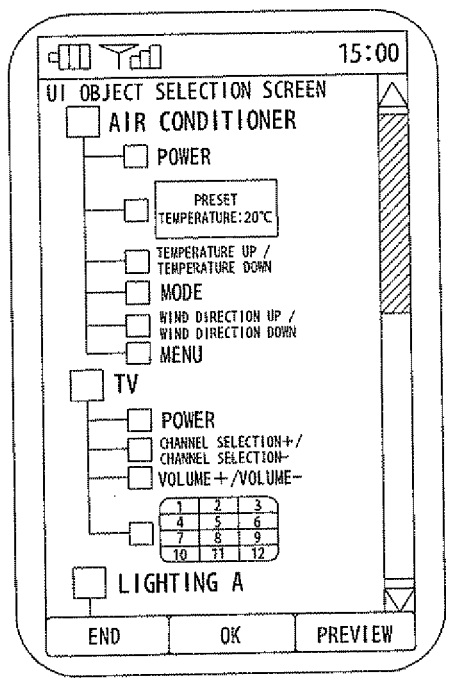
(D) 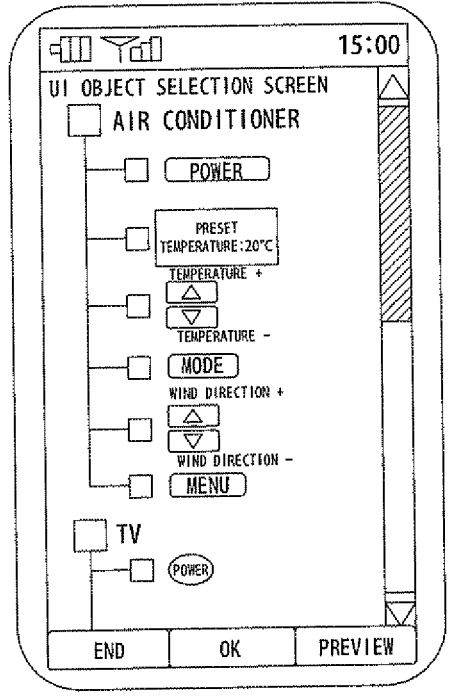

FIG. 7
(A) 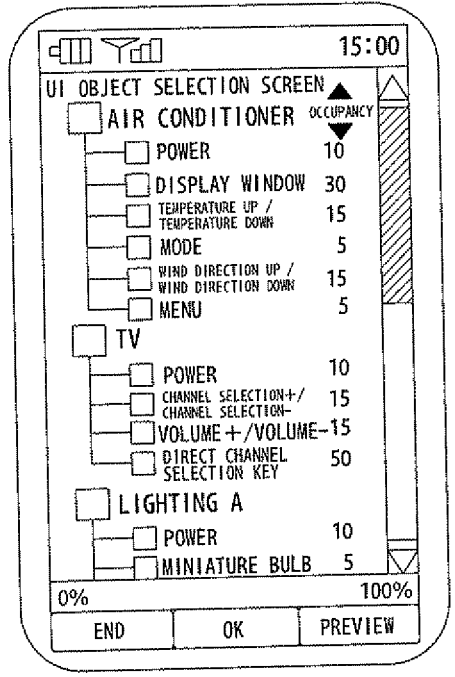
(B) 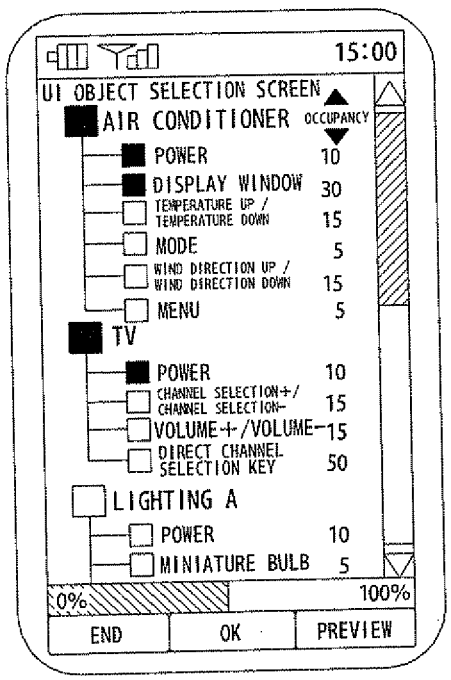
(C) 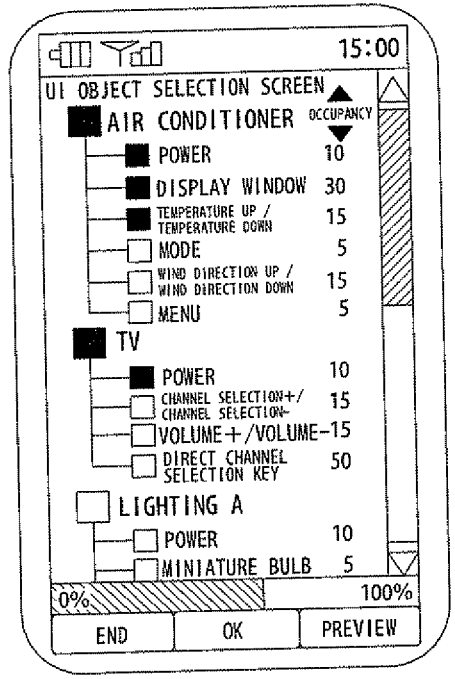
(D) 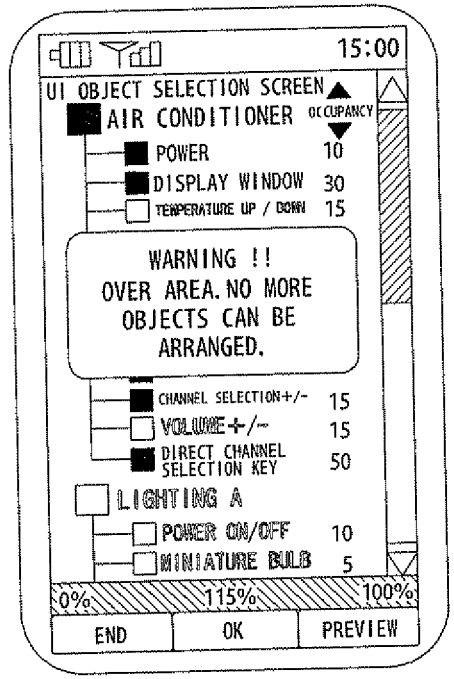

FIG. 9
(A)
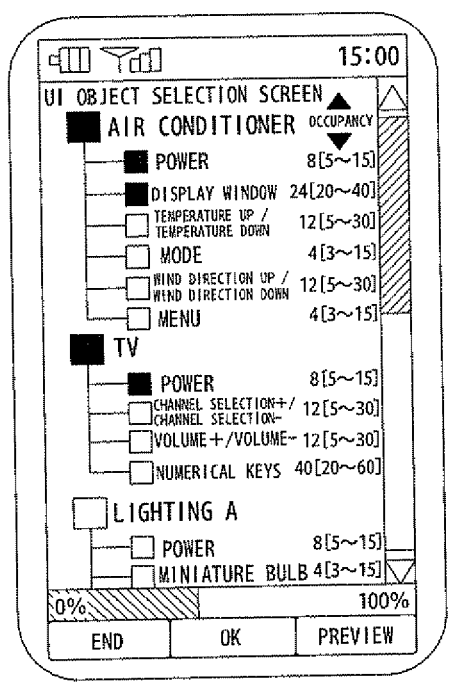
(B)
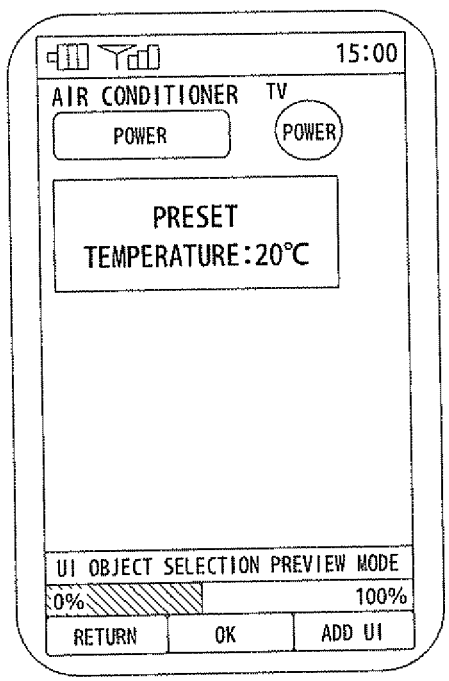

FIG. 13

```xml
<?xml version= "0.1" encoding= "Shift_JIS" ?>
<application_used= "tvremoconapp" />
<uiml>
        <interface id= "TV1 interface" particular_name= "TV1" >
            <structure>
                .
                .
            </structure>
            <style>
                .
                .
            </style>
            <behavior>
                .
                .
            </behavior>
        </interface>
        <template id= "t1_switch1" priority= "0" >
                .
                .
        </template>
        <template id= "t1_select_up" priority= "1" relate_id= "select_1" >
                .
                .
        </template>
        <template id= "t1_select_down" priority= "1" relate_id= "select_1" >
                .
                .
        </template>
        <template id= "t1_volume_up" priority= "1" relate_id= "volume_1" >
                .
                .
        </template>
        <template id= "t1_volume_down" priority= "1" relate_id= "volume_1" >
                .
                .
        </template>
        <template id= "t1_10key" priority= "3" >
                .
                .
        </template>

<peers>
                .
                .
        </peers>
</uiml>
```

FIG. 14

| APPLICATION NAME | UI_code | UI DEFINITION FILE NAME |
|---|---|---|
| tvremoconapp | Normal_UI | TV1_interface.uiml |
| airconremoconapp | Main_UI | AIR1_interface.uiml |
| lightremoconapp | LIGHT_UI | Light1_interface.uiml |
| calculatorapp | Simple_Cal_UI | Simple_calculator_interface.uiml |
| calculatorapp | Function_Cal_UI | Function_calculator_interface.uiml |
| ... | ... | ... |

57

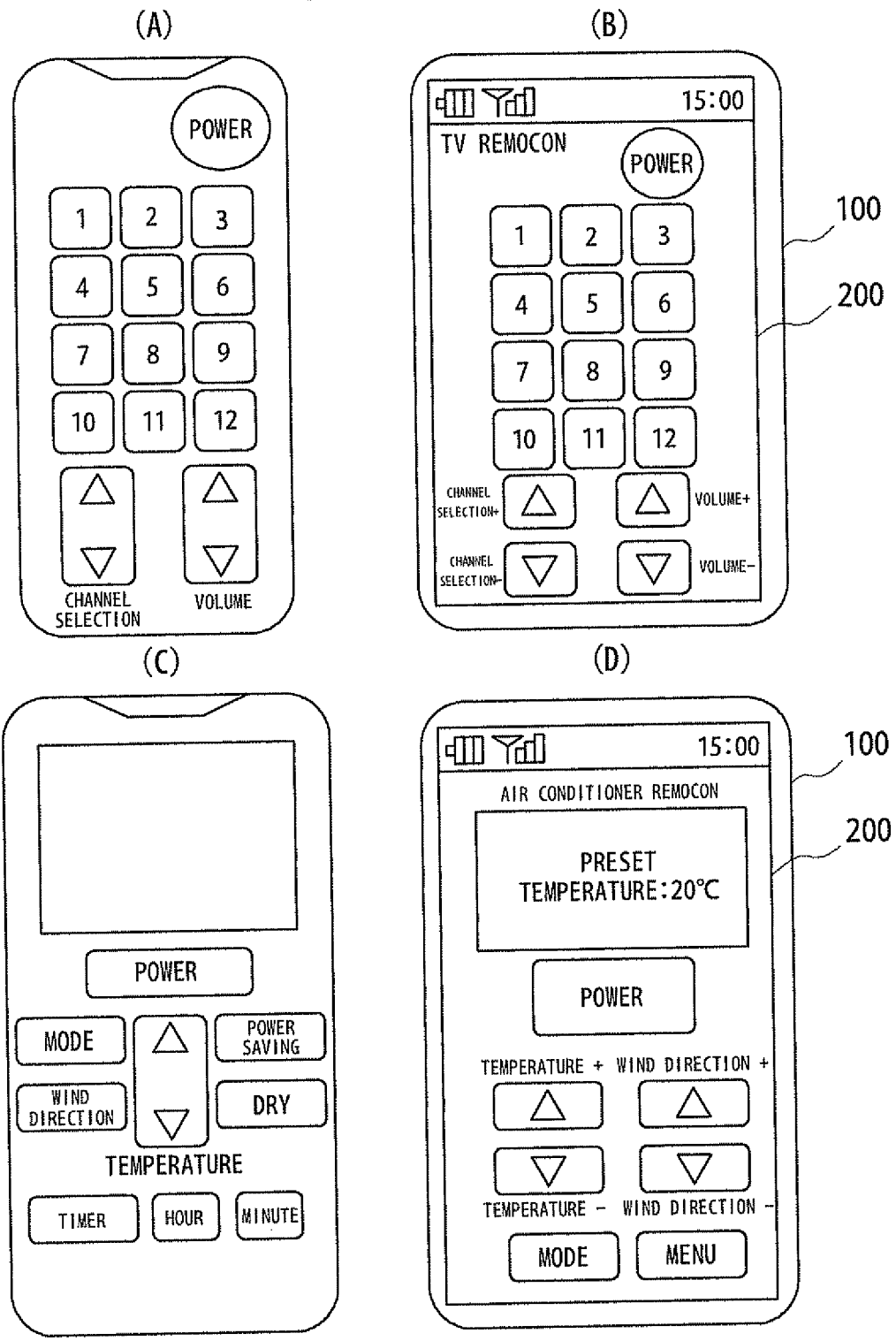

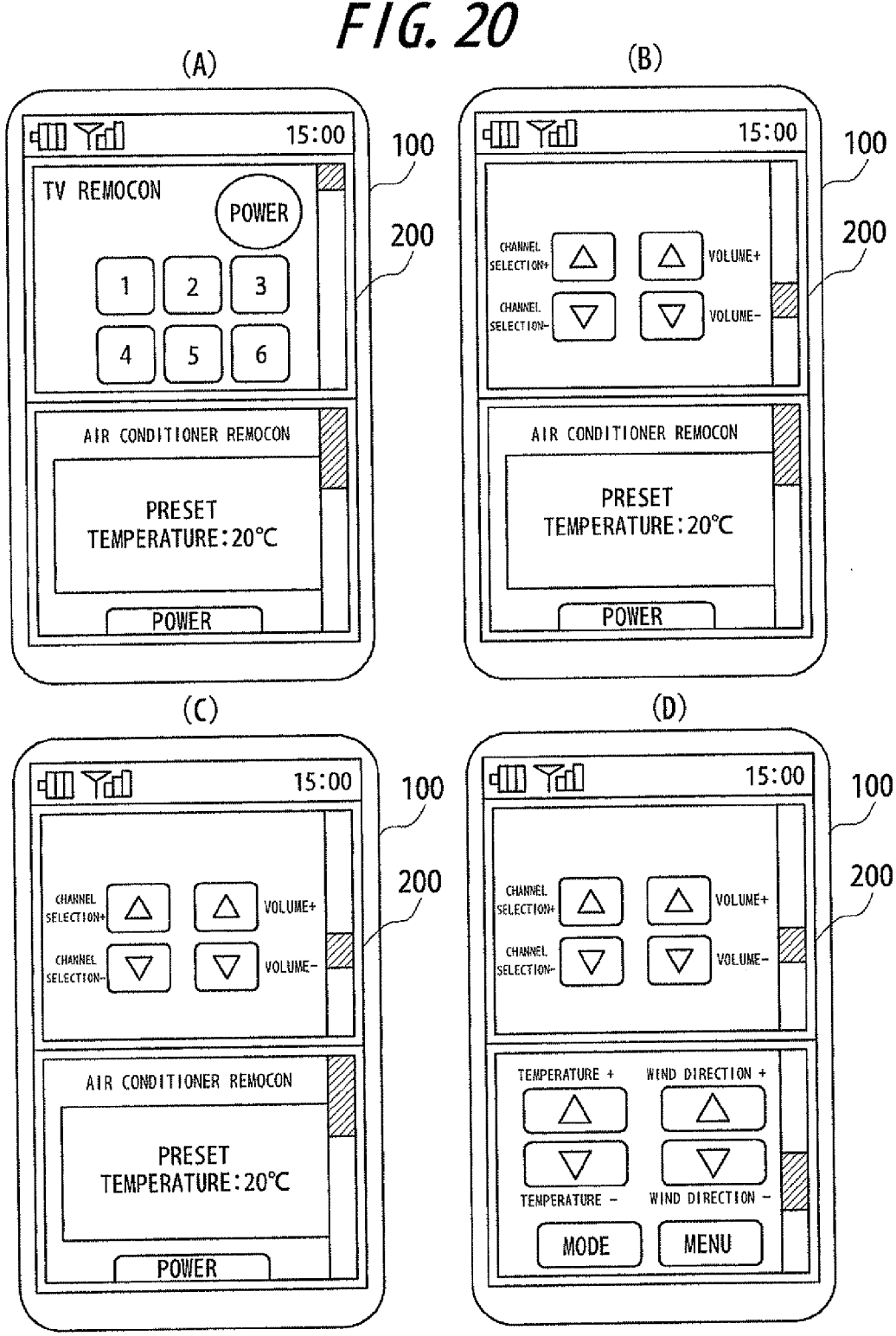

USER INTERFACE GENERATION APPARATUS

CROSS REFERENCE TO RELATED APPLICATION

This application claims priority to and the benefit of Japanese Patent Application No. 2008-95558 filed on Apr. 1, 2008, the entire contents of which are incorporated herein by reference.

TECHNICAL FIELD

The present invention relates to user interface generation apparatuses, and particularly, to user interface generation apparatuses for generating user interfaces of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UIs using animation and 3D display. In addition, there are mobile terminals having UIs which can be customized as desired by users. Such mobile terminals dramatically improve convenience for the users.

Conventional mobile terminals generally have UI designs and operation methods which are different between manufacturers and models. That is, the UI is unique to each terminal and most of the conventional mobile terminals have UIs highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, a UI based on XML (Extensible Markup Language) has been introduced. Expressing the UI by using an XML file whose description method is standardized facilitates reuse of the program codes and enables to port the UI to another model. Accordingly, it also enables to deal with UI alone independently from each terminal, such that the UI can be used by terminals of different models and different manufactures.

Representatives of such XML-based UI are UI Foundation developed by TAT (http://www.tat.se/), VIVID UI developed by Acrodea, Inc. (http://www.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform the multi-task processing for simultaneously executing a plurality of tasks in parallel. Moreover, mobile terminals with multi-window function to multiplex output screen displays by allocating a plurality of tasks processed in parallel and simultaneously to respective display areas (windows), have been becoming widely used.

Incidentally, Japanese Patent Laid-Open No. 2001-36652 discloses a scheme of remote handling (control) of a plurality of external equipments by infrared communication using a mobile phone terminal having an infrared communication unit. The mobile phone terminal described in Japanese Patent Laid-Open No. 2001-36652 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) incorporated in the terminal, the terminal body, which is normally used as the mobile phone, can be used as a remote controller (hereinafter, referred to as "remocon" simply) for remotely controlling the plurality of external equipments.

SUMMARY OF INVENTION

Technical Problem

According to the mobile phone terminal disclosed in the above Japanese Patent Laid-Open No. 2001-36652, a single mobile phone terminal can remotely control a plurality of external equipments based on respective external equipment control information corresponding to the external equipments. Therefore, there is no need to do cumbersome operation for a user to separately use individual remocon terminals for the plurality of external equipments, which improves convenience for the user.

If such functions of the remocon to remotely switch between the plurality of external equipments to be controlled remotely is implemented in the mobile terminal capable of multi-task processing stated above, it is not necessary to finish a remocon application to initiate another remocon application. That is, it is possible to initiate a plurality of applications on a single terminal at the same time and to use a desired remocon application among them timely.

However, the operation to switch the plurality of applications frequently is cumbersome.

If the multi-windows function stated above is embedded in the mobile terminal, UIs for operating a plurality of applications can be displayed on a plurality of windows, respectively. Thereby, it is possible to use the applications on a single screen simultaneously without switching among the plurality of applications.

For a TV remocon terminal alone as shown in FIG. 19(A), for example, UI of TV remocon application may be reproduced on a touch panel 200 of a mobile terminal 100, for example, while maintaining operability of the TV remocon terminal, as shown in FIG. 19(B). Although keys such as numerical keys or buttons of the remocon terminal shown in FIG. 19(A) are mechanical keys, the numerical keys or the buttons are reproduced as objects and displayed on the touch panel 200 of the mobile terminal 100 shown in FIG. 19(B). Similarly, for an air conditioner remocon terminal alone as shown in FIG. 19(C), UI of air conditioner remocon application may be reproduced on the touch panel 200 of the mobile terminal 100, while maintaining operability of the air conditioner remocon terminal, as shown in FIG. 19(D). Moreover, if each UI of application is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, there may be a need for cumbersome operations for both of the TV and the air conditioner. In such a case, the applications for both the TV and the air conditioner may be displayed simultaneously by dividing a display area of the display unit by using the multi-task function and the multi-window function. However, simultaneous display of the UIs results in displays as shown in FIG. 20(A) to (D), as each application has only the UI which assumed to be used solely.

FIG. 20(A) to (D) are diagrams illustrating states when the UIs of two applications are simultaneously displayed on the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 20(A), for example, the user needs to move the scroll bar in the window of the TV remocon UI so as to move a displayed area of the TV remocon UI, as shown in FIG. 20(B). Similarly, in order to adjust temperature of the air conditioner in a state shown as FIG. 20(C), for example, the user needs to move the scroll bar in the window of the air conditioner remocon UI so as to move a displayed area of the air conditioner remocon UI, as shown in FIG. 20(D). If a desired one by the user among the keys or the buttons and information display portions (hereinafter, referred to as "UI object"), which are components of the UI, is not displayed in the display area, the user needs to operate to move the display area every time. Moreover, when a plurality of applications are activated by the multi-window function and the UIs are displayed overlapping each other, it is necessary to select the window to activate it before starting input operation.

In particular, the terminal body of the mobile terminal is designed to be compact, and thus an area which can be occupied by either UI constituted of the touch panel or UI constituted of physical keys is very limited. Therefore, an operation unit which constitutes the UI of the application such as the remocon is generally designed in a minimum size. Accordingly, in order to display UIs of a plurality of applications, if each UI is reduced overall and displayed, each UI object becomes too small, possibly deteriorating operability thereof significantly. That is, if the UI designed to occupy an entire screen is displayed in multi screens, it results in deterioration of operability of the UI.

In addition, the user using the terminal may not need all of the UI objects composing the UI designed to occupy the entire screen. If UI objects unnecessary for the user are included in the UI, such UI objects are impeditive for operation and may possibly deteriorate overall operability.

Therefore, it is an object of the present invention in consideration of such conditions to provide a user an interface generation apparatus which compounds UIs only with selected UI objects and is capable of maintaining operability of each user interface, when user interfaces of a plurality of application programs are reproduced simultaneously.

Solution to Problem

In order to achieve the above object, a user interface generation apparatus according to a first aspect includes:
an application program execution unit for implementing a variety of functions based on an application program;
a user interface generation unit for generating a user interface for instructing the application program execution unit to execute a predetermined function based on the application program;
a memory unit for storing a user interface definition file including user interface object definition information for defining a user interface object, which is a component of the user interface; and
a selection screen generation unit for generating a selection screen for receiving selection of the user interface object based on the user interface object definition information, wherein
the selection screen generation unit, if it is instructed to compound a plurality of user interfaces, generates the selection screen based on the user interface object definition information included in the user interface definition file stored in the memory unit correspondingly to each of the plurality of user interfaces instructed, and
the user interface generation unit generates a compound user interface definition file including user interface object definition information of user interface objects selected on the selection screen, and generates a compound user interface based on the compound user interface definition file.

A second aspect of the present invention is that, in the user interface generation apparatus according to the first aspect, the user interface object definition information includes user interface object attribute information including information indicating a relationship between the user interface object and another user interface object composing the user interface including the user interface object as a component, and
the user interface generation unit, if it is instructed to compound the plurality of user interfaces, determines an arrangement of the user interface objects of the compound user interface based on the user interface object attribute information of the user interface objects selected on the selection screen and identification information of user interfaces to which the user interface objects belong.

A third aspect of the present invention is the user interface generation apparatus according to the second aspect, further including an occupancy accumulation unit for accumulating occupancies of the user interface objects, selected on the selection screen, in the compound user interface based on the user interface object attribute information, wherein
the selection screen generation unit, if the occupancy of the compound user interface accumulated by the occupancy accumulation unit exceeds a predetermined value, cancels selection of a user interface object selected on the selection screen after the occupancy exceeds the predetermined value and informs that the user interface object cannot be selected.

A fourth aspect of the present invention is that, in the user interface generation apparatus according to any one of the first to the third aspects,
the memory unit stores the compound user interface definition file generated based on the user interface objects selected on the selection screen, and
the application program execution unit, when activating the compound user interface based on the compound user interface definition file stored in the memory unit, activates a corresponding application program in the background based on relevant application program information specifying an application program corresponding to each user interface object composing the compound user interface.

BRIEF DESCRIPTION OF DRAWINGS

FIG. 2 is a table exemplifying relevant application program information according to the present invention;

FIG. 6 is a diagram illustrating examples of a user interface object selection screen displayed to compound user interfaces according to the present invention;

FIG. 7 is a diagram illustrating operations of the user interface object selection screen according to the present invention;

FIG. 9 is a diagram illustrating operations of the user interface object selection screen according to the present invention;

FIG. 13 is a diagram illustrating an example of a user interface definition file according to the present invention;

FIG. 14 is a table exemplifying a user interface administration table for each application program according to the present invention;

FIG. 19 is a diagram illustrating states of conventional remocon terminals reproduced by the user interfaces of a mobile terminal; and FIG. 20 is a diagram exemplifying compound of two user interfaces by a conventional mobile terminal.

Figure 1:
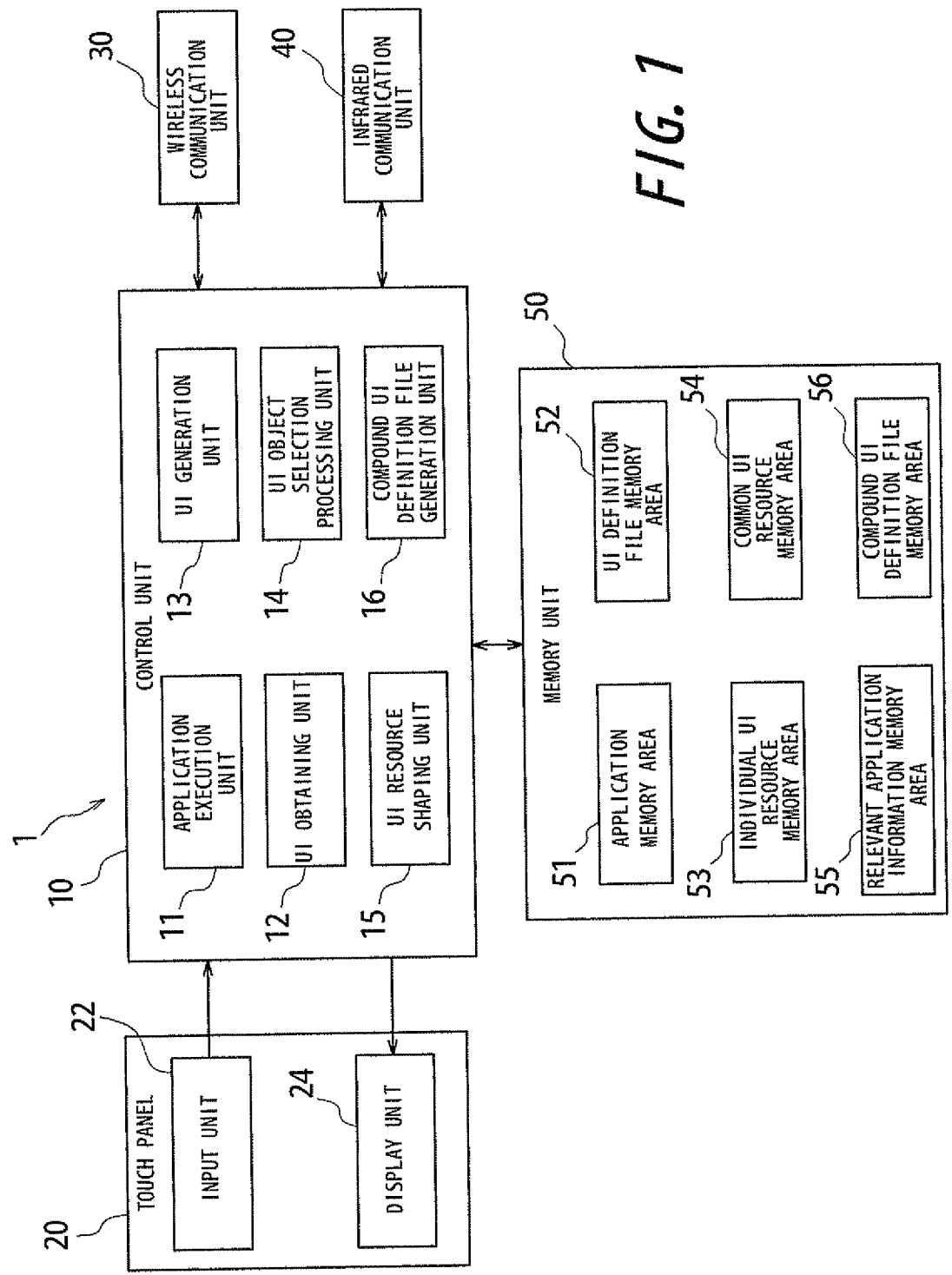
FIG. 1 is a block diagram illustrating a schematic configuration of a user interface generation apparatus according to the present invention.

REFERENCE SIGNS LIST 1 mobile phone
10 control unit
11 application program execution unit
12 user interface obtaining unit
13 user interface generation unit
14 user interface object selection processing unit
15 user interface resource shaping unit
16 compound user interface definition file generation unit
20 touch panel
22 input unit
24 display unit
30 wireless communication unit
40 infrared communication unit
50 memory unit
51 application program memory area
52 user interface definition file memory area
53 individual user interface resource memory area
54 common user interface resource memory area
55 relevant application program information memory area
56 compound user interface definition file memory area

DESCRIPTION OF EMBODIMENTS

Embodiments of the present invention will be described with reference to the accompanying drawings. In each of the embodiments described below, a mobile phone having a remocon function for remotely controlling various external apparatuses is used as an example of a user interface (hereinafter, referred to as "UI") generation apparatus according to the present invention. However, the UI generation apparatus according to the present invention is not limited to the mobile phone but may be applicable to any portable terminals such as, for example, a laptop computer, PDA and the like. In addition, the UI generation apparatus according to the present invention is also applicable to an apparatus which needs to mount it, even if it is not a mobile terminal. It is to be noted that the present invention primarily intends to compound a plurality of UIs to be used simultaneously. Therefore, an application instructed by each UI is not limited to a remocon function but the present invention may be applicable to various kinds of applications.

FIG. 1 is a block diagram illustrating a schematic configuration of a UI generation apparatus according to the embodiment of the present invention.

A mobile phone 1 includes a control unit 10 for controlling the overall operation and a touch panel 20 for receiving input by a user and for displaying a result of input and the like, according to each application. The touch panel 20 has an input unit 22 constituted of matrix switches and the like to receive input by the user and arranged on top of a display unit 24 constituted of a liquid crystal display and the like. The display unit 24 displays according to an application program and also displays an image of UI, such as various types of keys or buttons for receiving input by the user, in a predetermined UI display area.

In addition, the mobile phone 1 also includes a wireless communication unit 30 for transmitting and receiving various information such as voice call, data of e-mail and the like to/from a base station (not shown) and an infrared communication unit 40 for communicating with various external equipments (not shown) by using infrared rays. The mobile phone 1 transmits and receives a variety of data to/from the external equipments by using the wireless communication unit 30 via the internet, by radio and the like.

The mobile phone 1 further includes a memory unit 50 for storing input information and various applications and also for functioning as a work memory. The memory unit 50 includes an application memory area 51, a UI definition file memory area 52, an individual UI resource memory area 53, a common UI resource memory area 54, a relevant application information memory area 55, and a compound UI definition file memory area 56.

The control unit 10 includes an application execution unit 11, a UI obtaining unit 12, a UI generation unit 13, a UI object selection processing unit 14, a UI resource shaping unit 15, and a compound UI definition file generation unit 16.

The application execution unit 11 of the control unit 10 executes various applications stored in the application memory area 51 of the memory unit 50, as well as controlling such execution. In addition, the application execution unit 11, based on input to the UI corresponding to the application stored in the application memory area 51, executes functions of the application corresponding to the input.

The UI obtaining unit 12 obtains resource (image data and the like) and a UI definition file (XML file and the like) from outside the terminal via the wireless communication unit 30. The UI generation unit 13 performs parsing process and DOM (Document Object Model) process on the UI definition file, and generates the UI to be used actually. The UI generation unit 13 interprets information of the UI, described in an XML form, by using an XML engine and displays the UI generated based on the UI definition file on the display unit 24 of the touch panel 20.

By analyzing UI object definition information defining the UI object to be shown on the display unit 24, the UI object selection processing unit 14 controls and performs processing to generate a selection screen for receiving selection of the UI objects by the user. Hereinafter, the screen displaying the UI objects on the display unit 24 to receive selection by the user is referred to as a "UI object selection screen" or simply "selection screen". Accordingly, the UI object selection processing unit 14 constitutes a selection screen generation unit according to the present embodiment. Moreover, the UI object selection processing unit 14, when instructed to compound a plurality of UIs in a predetermined display area of the display unit 24, compounds the UIs based on a plurality of specified UI definition files.

The UI object selection processing unit 14 includes an occupancy accumulation unit (not shown) for accumulating occupancies of selected UI objects on the UI object selection screen. The occupancy accumulation unit accumulates occupancies of the UI objects based on the UI object attribute information included in the UI object definition information of each UI object.

The UI resource shaping unit 15 performs preview processing of the selected UI object and processing to enlarge or reduce data of resource used to compound UIs. In this case, data of resource stored in the individual UI resource memory area 53 or the common UI resource memory area 54 are read out and used. The compound UI definition file generation unit 16 generates and outputs the UI compounded by the UI object selection processing unit 14 as the compound UI definition file.

The application memory area 51 of the memory unit 50 stores a variety of applications. The UI definition file memory area 52 stores the UI definition file defining a sequence of generation rules to generate each UI overall. The individual UI resource memory area 53 stores individual UI resource such as image data and character string (text) data used to generate UI unique to each application. The common UI resource memory area 54 stores common UI resource such as image data and font data commonly used by the UIs used by the terminal, except for the individual UI resource unique to each application. When the UI is actually generated, the image data and the text data stored in the individual UI resource memory area 53 and the common UI resource memory area 54 are displayed on the display unit 24 of the touch panel 20.

Furthermore, the compound UI definition file memory are 56 stores the UI definition file generated by the compound UI definition file generation unit 16. In addition, the relevant application information memory area 55 stores relevant application information including activation information of an application relevant to each compound UI definition file. FIG. 2 shows an example of the relevant application information. In FIG. 2, compound UI definition files are shown on the left and relevant applications corresponding thereto are shown on the right.

Next, the UI definition file stored in the UI definition file memory area 52 according to the present embodiment is described.

The UI definition file memory area 52 of the memory unit 50 stores the UI definition file defining specifications and operations of an application of the UI, required to execute the application stored in the application memory area 51. Although the same UI may be used by different applications, here it is assumed that the UI used by each application differs from one another, for convenience of description, and that the UI definition files corresponding to the applications are stored. For example, a TV remocon UI definition file is stored in the UI definition file memory area 52, correspondingly to a TV remocon application for remotely controlling a TV set (not shown), which is the external equipment, by using the mobile phone 1. Similarly, an air conditioner remocon UI definition file is stored in the UI definition file memory area 52, correspondingly to an air conditioner remocon application for remotely controlling an air conditioner (not shown), which is another external equipment, by using the mobile phone 1.

In the present embodiment, a UIML (User Interface Markup Language) form based on XML language is used as an example of a language to describe the UI definition file. In accordance with a definition described in the UIML form, the UI generation unit 13 displays the UI on the display unit 24 of the touch panel 20 of the mobile phone 1 and the application execution unit 11 executes processing in response to input to the input unit 22 by the user.

The UI definition file according to the present embodiment includes UI object definition information which defines a UI object to be shown on the display unit 24. The UI object definition information includes information defining an image and a text for showing the UI object such as key or button, which is a component of the UI to be displayed on the display unit 24, and information defining an operation when there is input to the UI object (in practice, when there is input to a part of the input unit 22 corresponding to the UI object) and the like.

According to the present embodiment, as the information defining the operation when there is input to the input unit 22 corresponding to a position of the UI object, action information, indicating contents of the operation to be executed by each application execution unit if an event is occurred to each UI object, is included in the UI object definition information. For example, if an input event occurs to the input unit 22 corresponding to a position of the UI object of "Power" on the TV remocon UI, the action information defines to issue an instruction to TV remocon application to transmit an infrared signal to turn on or off the power of the TV as the external equipment.

As stated above, the UI object definition information includes the UI object attribute object, which is information on each UI object used to compound a plurality of UIs. A variety of information such as information on relationships with other UI objects composing the UI and information on priority to display each object based on the relationship between each UI object and other UI objects when a plurality of UIs are compounded may be added to the UI object attribute information. In addition, the UI definition file includes UI identification information corresponding to the UI definition file. A name of the UI, for example, may be added as text information to the UI identification information.

Next, a sequence of operations to generate the compound UI by the mobile phone 1 according to the present embodiment is described with reference to FIG. 3 to FIG. 7.

According to the present embodiment, the user previously considers that it is necessary to use a plurality of applications simultaneously but separately, and selects UI objects from a plurality of the UI. By adopting only the UI objects selected, the compound UI composed of only the UI objects desired by the user is generated. Therefore, the UI definition file memory area 52 of the memory unit 50 stores in advance the UI definition file of each UI corresponding to the variety of applications stored in the application memory area 51.

Figure 3:
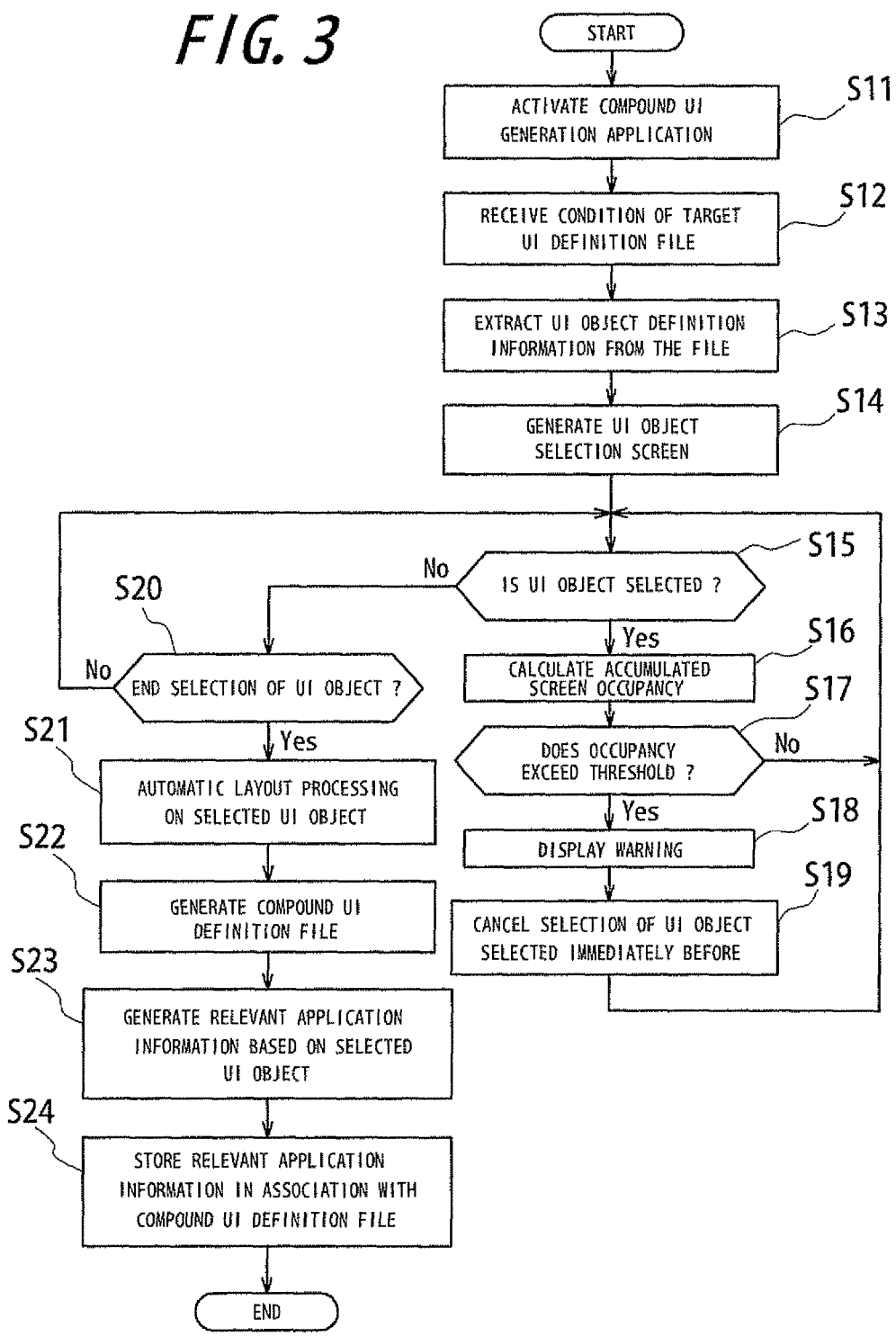
FIG. 3 is a flowchart illustrating overall processing to generate a compound user interface according to the present invention.
Figure 4:
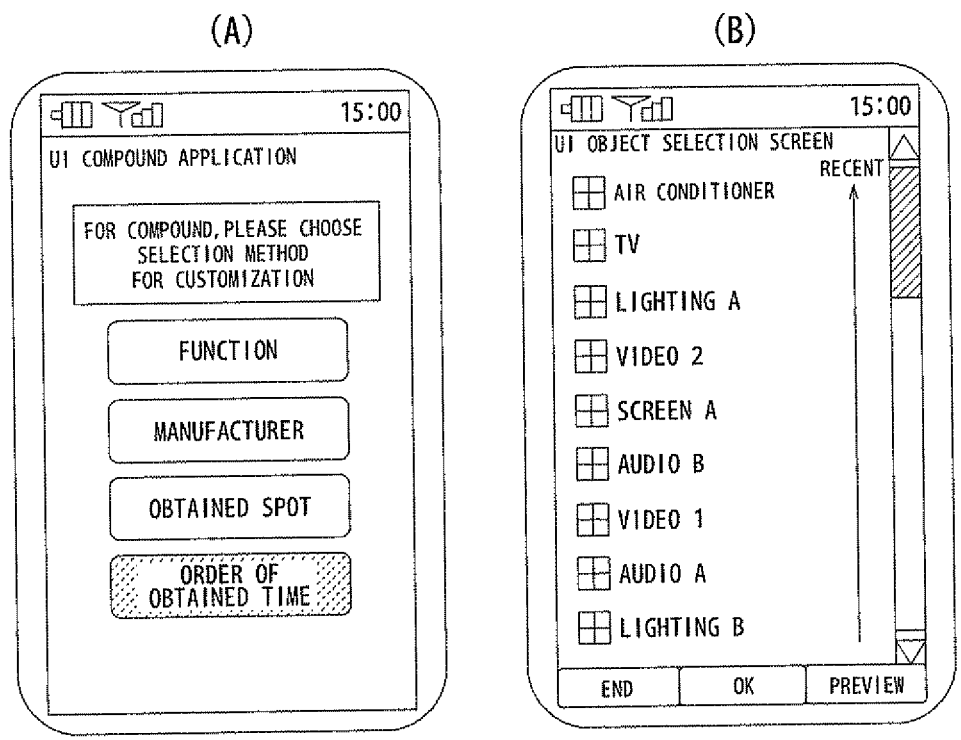
FIG. 4 is a diagram illustrating conditions to select user interfaces to compound user interfaces according to the present invention.
Figure 5:
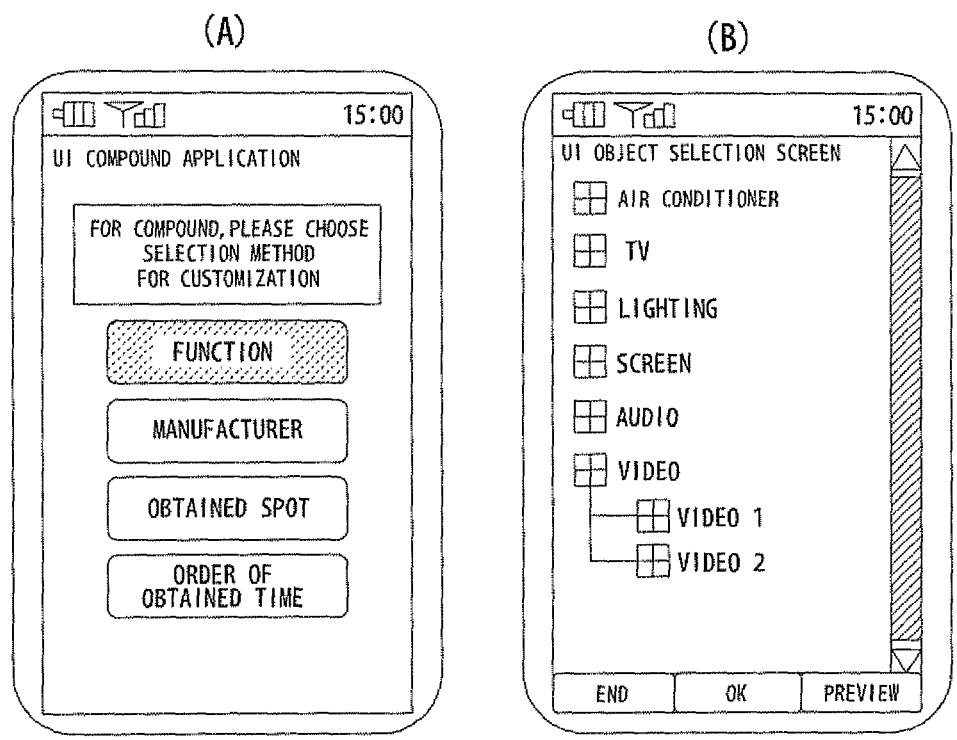
FIG. 5 is a diagram illustrating conditions to select user interfaces to compound user interfaces according to the present invention.

FIG. 3 is a flowchart illustrating a sequence of overall processing to generate the compound UI by the mobile phone 1 according to the present embodiment.

First, based on input operation to the input unit 22 by the user and the like, the application execution unit 11 reads out and activates an application for performing processing to generate the compound UI (compound UI generating application) from the application memory area 51 (step S11). The compound UI generating application is configured to be able to perform processing to generate the compound UI by selecting only desired UI objects from the plurality of UIs.

When the compound UI generating application is initiated, the UI object selection processing unit 14 displays conditions to narrow down UI definition file as a selection target on the display unit 24 such that the user designates a UI to select UI objects, from the plurality of UIs, and receives specification of the conditions by the user at the input unit 22 (step S12).

That is, when the compound UI generating application is activated, the UI object selection processing unit 14 displays a screen as show in FIG. 4(A), for example, on the display unit 24 so as to receive specification of the condition to select UIs for generating the compound UI. As shown in FIG. 4(A), when "Order of Obtained Time" is selected at the input unit 22 by the user, for example, the UI object selection processing unit 14 displays names of the UIs of the UI definition file obtained by the mobile phone 1 in reverse chronological order from an upper side of the screen, as shown in FIG. 4(B). The user may select a UI, which includes UI objects the user desired to adopt, among the names of the UIs listed. When listing up the names of the UIs on the display unit 24, the UI object selection processing unit 14 may display names in order of newly obtained by referring to information on time and date added (or updated) when each UI definition file is stored in the UI definition file memory area 52 for the first time.

In addition, as shown in FIG. 5(A), if "Function", for example, is selected on the input unit 22 by the user, the UI object selection processing unit 14 displays respective UI names of UI definition files by categorizing UIs according to function, that is, according to application (in this case, equipments corresponding to the remocon application are displayed), as shown in FIG. 5(B).

In addition to the conditions stated above, a variety of conditions may be considered to select UIs to generate a compound UI, such as "Manufacturer" for categorizing the UIs according to manufacturers which provide respective UN (or applications corresponding to the UIs), "Obtained spot" for categorizing the UIs according to spots (for example, "My Room", "Living Room" and the like) where the mobile terminal 1 obtains the UI definition files via the UI obtaining unit 12 and the like. The following description is a case when the user selects UI objects by categorization of "Function" of UIs, as shown in FIG. 5(B).

When the user selects a condition as shown in FIG. 5(A) and UI names of the UI definition files are displayed based on the condition selected by the user as shown in FIG. 5(B), the UI object selection processing unit 14 analyzes contents of a plurality of UI definition files narrowed down by such selection and extracts the UI object definition information included therein (step S13). After extracting the UI object definition information of the UI objects, which may be adopted possibly, in this manner, the UI object selection processing unit 14, when each UI is selected, displays information of UI objects composing the UI, based on the UI object definition information (step S14).

That is, when each UI (for example, "Air Conditioner", "TV" and the like) whose name is shown in FIG. 5(B) is selected, text information (name of each key) of UI objects composing the UI is displayed as shown in FIG. 6(A) if the name of each object is given as the text information to the UI definition file corresponding to each UI. In this case, in order to display the names of the UI objects, the UI object selection processing unit 14 extracts and displays text data associated with the UI objects included in the respective UI object definition information. FIG. 6(A) shows an exemplary case when "Air Conditioner" and "TV" among the UIs shown in FIG. 5(B) are selected (by input such as touching checkboxes and the like) and thereby UI objects composing the air conditioner remocon application and the TV remocon application are displayed.

When information of the UI objects of the selected UIs displayed, the UI object selection processing unit 14 receives selection of the UI objects to be adopted by the user. Therefore, according to the present embodiment, the screen of the display unit 14 which displays the information on UI objects and receives selection by the user constitutes the UI object selection screen.

When the information on the UI objects composing each UI is displayed as shown in FIG. 6(A), the user hardly selects only a "Temperature Up" (increase temperature) key without selecting a "Temperature Down" (decrease temperature) key of the UI of the air conditioner remote application but usually selects both of the keys in pairs. Like this, the UIs used for remote applications have various UI objects to be used in pairs. Therefore, it is preferred to allow the user to determine whether to adopt such UI objects in pairs.

Therefore, relevance information indicating that a plurality of UI objects are paired (or belong to the same group) is added as the UI object attribute information to the UI object definition information included in the UI definition file and the UI objects in pairs are defined based on a value of the relevance information (attribute). In exemplary UI definition files in an XML form shown at an end of the present specification, the relevance information of the UI object is shown as attribute (relate_ID). The plurality of UI objects may be handled as elements of the same group by adding the same value to the attribute (relate_ID).

As the UI objects in pairs are displayed in association with one another in this manner, it is possible to determine whether to adopt the UI objects relevant to each other in pairs. In the example shown in FIG. 6(B), the names of the UI objects "Temperature" and "Wind Direction" of the air conditioner remocon UI and the UI objects "Channel Selection" and "Volume" of the TV remocon UI are displayed in pairs and allowed to determine whether to adopt or not in pairs. Collective display of the names of such UI objects enables saving of a display space and effective utilization of a limited display area of the selection screen.

In addition, some UI definition file may not have all of names of the UI objects composing each UI, as text information. In this case, that is, if text data which should be displayed are not contained in the UI object definition information, the UI object selection processing unit 14 reads out image data of the UI object from resource data stored in the individual UI resource memory area 53 or the common UI resource memory area 54 correspondingly to each UI and displays the image in a reduced size.

Thereby, even if there is no text information of a name of a UI object, it is possible to display the UI object composing the UI to be visually recognizable by the user, as shown in FIG. 6(C). FIG. 6(C) shows an example that, since there is no text information corresponding to the UI objects of "Display Window" and "Direct Channel Selection Key" in the UI object definition information, these UI objects are displayed being reduced.

It is also possible to display reduced images of all UI objects as default setting of the mobile phone 1 or as setting desired by the user, as shown in FIG. 6(D). Since each UI object certainly uses an image when displayed on the display unit 24 to be used as the UI, the image of the UI object in the reduced size may be displayed regardless of whether the UI object includes the text information of the name. Thus, display of not only the text information but also the images facilitates visual selection of the UI object of the user. In an example shown in FIG. 6(D) as well, the UI objects which should be handled as pairs are collectively displayed by using the relevance information of the UI objects.

After displaying the UI object selection screen shown in one of FIG. 6(A) to (D), the UI object selection processing unit 14 receives selection input of the UI object by the user (step S15). On receiving selection input (by input such as touching the checkboxes and the like) at the input unit 22 by the user (Yes of step S15), the UI object selection processing unit 14 calculates a total of ratios of areas (hereinafter, referred to as "accumulated screen occupancy") occupied by the selected UI objects in a predetermined UI display area of the display unit 24 (step S16). For this processing, an occupancy of each UI object in the UI display area is included in advance as the UI object attribute information in the UI object definition information of each UI object.

At this time, if the UI objects are selected as shown in FIG. 7(B) on the UI object selection screen shown in FIG. 7(A), for example, it is preferred to display a bar chart and the like of the accumulated screen occupancy at a lower section of the UI object selection screen excluding a soft key area at a bottom of the display unit 24. In an example shown in FIG. 7(B), UI objects "Power" (occupancy 10%) and "Display Window" (occupancy 30%) are selected from the air conditioner remocon UI and an UI object "Power" (occupancy 10%) is selected from the TV remocon UI. Therefore, the bar chart at the lower section in the selection screen indicates that the accumulated screen occupancy is 50%. This means that the UI objects which occupy 50% of the UI display area when the UI is actually compounded and displayed on the display unit 24, are currently selected. Blacked checkboxes in FIG. 7 indicate that the UI objects with such checkboxes are selected.

FIG. 7(C) shows that the UI object "Temperature Up/Down" (occupancy 15%) is selected from the air conditioner remocon UI by further input to the input unit 22 by the user and the accumulated screen occupancy is increased to 65%. Although input by the user to sequentially add the UI object is received, the compound UI cannot be displayed in the UI display area if the accumulated screen occupancy exceeds a predetermined threshold (for example, 100%). Therefore, the UI object selection processing unit 14 checks whether the accumulated screen occupancy exceeds the predetermined threshold (step S17).

Since other UI objects can be added in a manner stated above so far as the accumulated screen occupancy does not exceed the predetermined threshold (No of step S17), the UI object selection processing unit 14 returns to step S15 to receive further input to the input unit 22 by the user. However, if the accumulated screen occupancy exceeds the predetermined threshold when the UI object is selected (Yes of step S17), this UI object cannot be arranged. Thus, the UI object selection processing unit 14 displays a warning message on the display unit 24 as shown in FIG. 7(D), for example (step S18).

Instead of using the warning message at step S18 or together with the warning message, it is also possible to show the UI objects which, if selected, make the accumulated screen occupancy exceed the predetermined threshold, in gray-out to be unselectable. In the selection screen shown in FIG. 7(D), the UI objects which, if selected, make the accumulated screen occupancy exceed 100% are shown in gray-out to indicate that they cannot be selected, and the warning message is displayed as the user inputs to select one of these objects regardless of such condition.

Since the UI object selected beyond the predetermined threshold of the accumulated screen occupancy cannot be arranged when composing the UI, the UI object selection processing unit 14 cancels selection of the UI object selected beyond the threshold (step S19) and returns to step S15 to receive selection of another UI object (which does not make the accumulated screen occupancy exceed the predetermined threshold).

Figure 8:
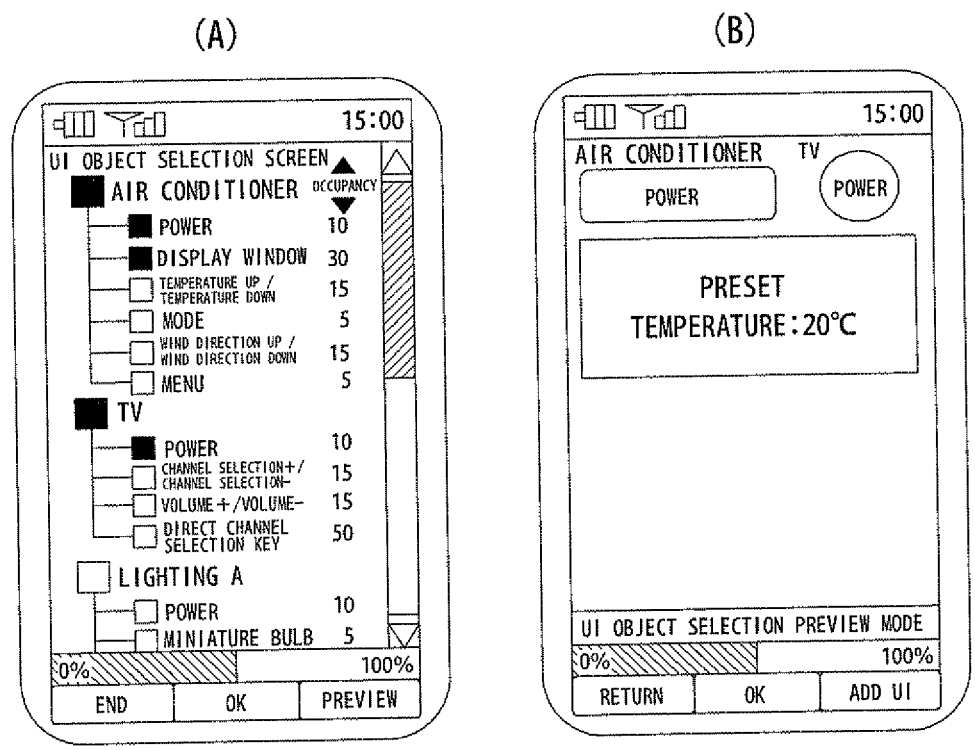
FIG. 8 is a diagram illustrating operations of the user interface object selection screen according to the present invention.

In this manner, the user can select the UI objects from the plurality of UIs as desired, so far as the accumulated screen occupancy does not exceed the predetermined threshold. In addition, when the user selects the UI objects, it may be difficult for the user to recognize actual arrangement of the UI objects with the bar chart of the accumulated screen occupancy alone. In such a case, in response to input to the soft key "Preview" at bottom right corner of the display unit 24 as shown in FIG. 8(A), for example, the UI object selection processing unit 14 may display a preview screen of current arrangement of the UI objects. Such preview screen enables the user to determine whether to adopt the UI objects while checking actual arrangement of the UI objects.

In addition, there may be a case in which, when determining whether to adopt a UI object, the user wishes to slightly reduce UI objects already selected, so as to further add another UI object. According to the present embodiment, therefore, the UI object selection screen may be displayed as shown in FIG. 9(A), such that the UI objects can be reduced. In FIG. 9(A), the occupancy of the UI object "Power" of the air conditioner remocon UI displayed as 8[5-15] means that the occupancy of the UI object is 8% currently but may be adjusted between 5% and 15%. In FIG. 9(A), all UI objects are reduced to have smaller occupancies in comparison with those in FIG. 8. If the preview display described above is executed at FIG. 9(A), UI objects smaller than those in FIG. 8(B) and the reduced bar chart indicating the accumulated screen occupancy are displayed as shown in FIG. 9(B). It is possible to reduce all of the plurality of UI objects currently selected collectively or to reduce each UI object individually.

Processing to enlarge or reduce the UI object is performed by the UI resource shaping unit 15 when the UI object selection processing unit 14 reads out each UI object from the individual UI resource memory area 53 or the common UI resource memory area 54.

Also, in order to reduce the UI objects as stated above, it is preferred to set an upper limit and a lower limit of the occupancy in consideration of a practical size of each UI object. Both of the limits are set based on a type of the UI object and a resource to be used, and stored as the UI object definition information for each UI object. It thereby prevents to generate a user-unfriendly UI with the UI objects reduced too much.

In addition, there may be a case in which operations to switch between the preview screen with the UI object arranged and the UI object selection screen are burdensome. Therefore, according to the present embodiment, it is possible to add the UI object while the preview screen is displayed.

Figure 10:
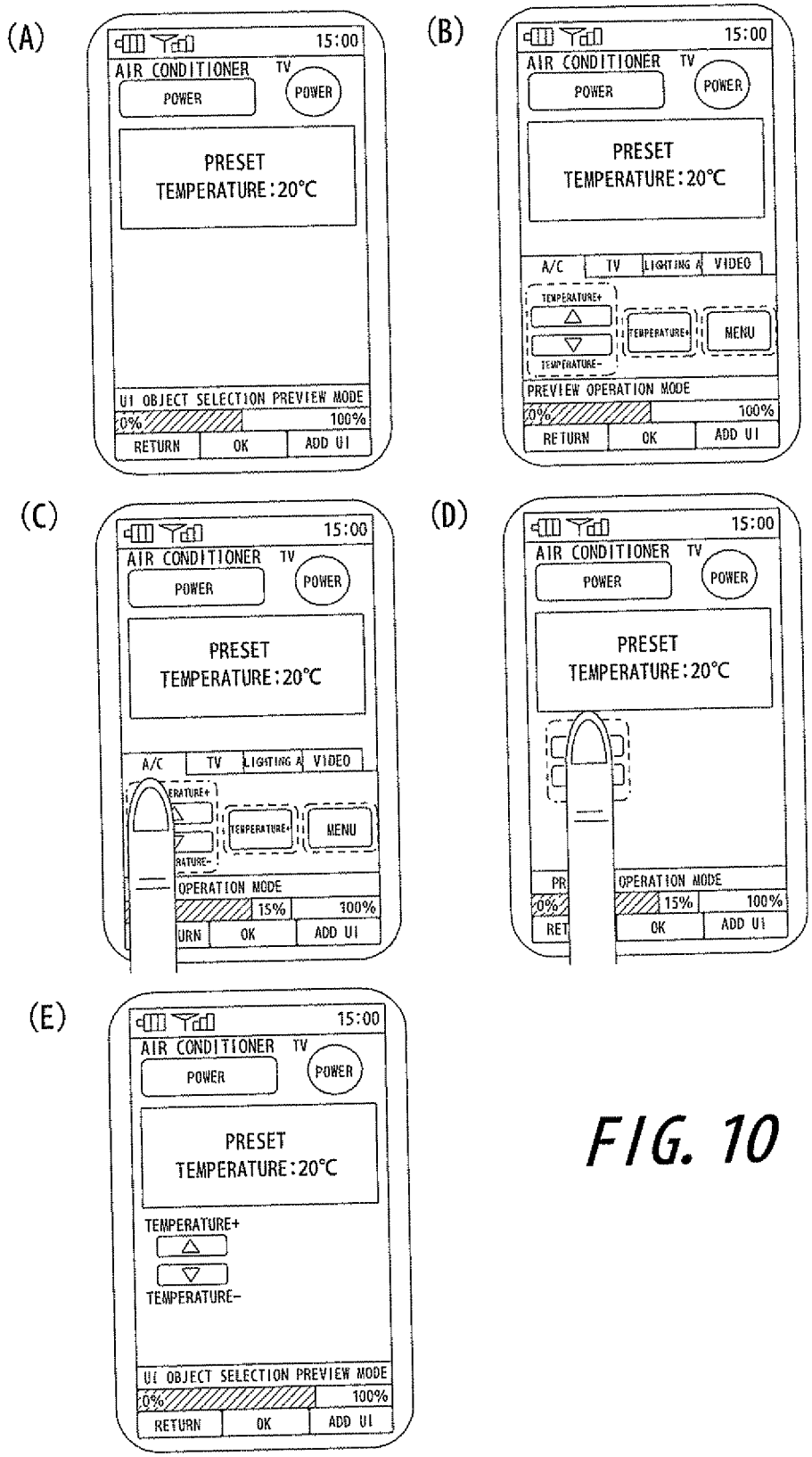
FIG. 10 is a diagram illustrating operations of the user interface object selection screen according to the present invention.

That is, in response to input by the user to a soft key "Add UI" at bottom right corner on the display unit 24 while the preview screen is displayed as shown in FIG. 10(A), a UI object adding screen is displayed as shown in FIG. 10(B). In an example shown in FIG. 10(B), UI objects not selected yet are displayed for each UI so as to receive selection input by the user. In the example shown in FIG. 10, the UI objects are classified by tab display, for each UI of application. On the tab shown in FIG. 10(B), "A/C" indicates the air conditioner.

In this case, it is preferred that each UI object can be dragged in accordance with input to the touch panel 20 with the user's finger and, as shown from FIG. 10(C) to (D) in series, that the UI object is selected in response to input by dragging upward. Occupancy of the UI object selected in this manner is reflected in the bar chart. An area necessary to arrange each UI object is shown by dashed lines surrounding the UI object. Providing a reasonable space around the image of the UI object enables to maintain certain operatively even if multiple UI objects are arranged adjacently.

In the UI object adding screen, the user may arrange the UI objects as desired by dragging each UI object. As shown in FIG. 10(D) to FIG. 10(E), a position of the UI object is determined when the user detaches his/her finger from the touch panel 20 after positioning the UI object.

In addition, there may be UI objects which are not in a relationship of equals but in a master/subordinate relationship with one another. That is, it is the first operation for most of remocons to turn power on, followed by other operations. In case of the TV remocon UI, for example, there is no necessity to select a channel or to adjust volume without turning power on. In this case, accordingly, it may be considered that an object of power is "master" and other objects in association with the following operations to the power ON are "subordinate". According to the present embodiment, when the user selects UI objects, the user may not be allowed to select "subordinate" UI objects before selecting a "master" UI object.

Figure 11:
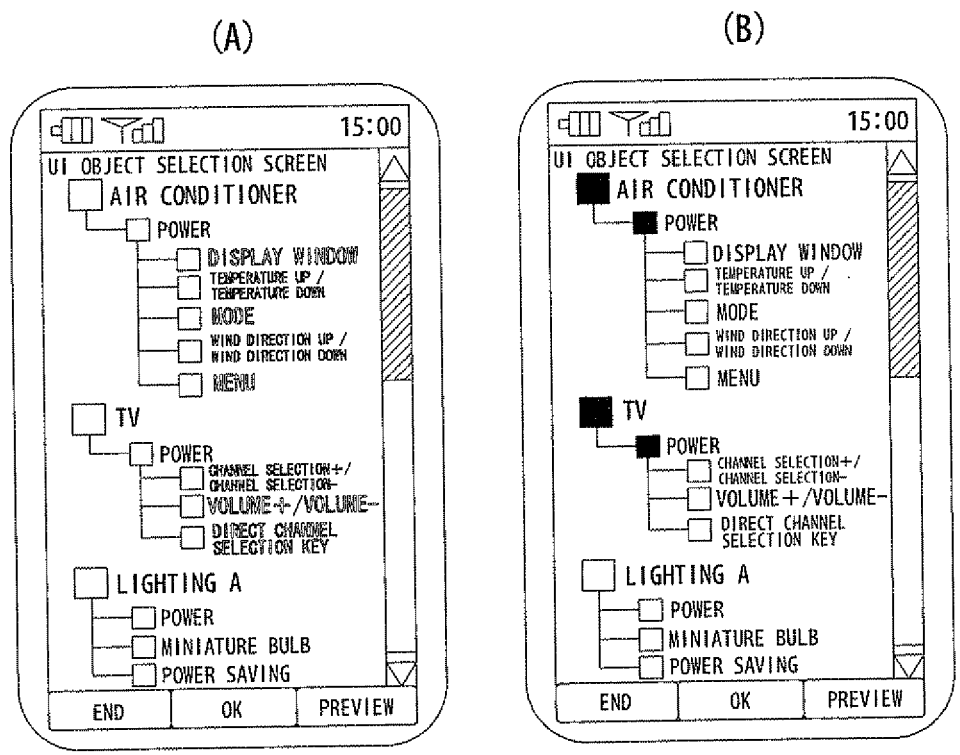
FIG. 11 is a diagram illustrating operations of the user interface object selection screen according to the present invention.

As shown in FIG. 11(A), for example, UI objects subordinate to the UI object "Power" in each UI are grayed out to be unselectable before the UI object "Power" is selected. When the master UI object "Power" is selected, it is allowed to select the UI objects subordinate to the master UI object as shown in FIG. 11(B).

In order to add the master/subordinate relationship as stated above to the UI objects, the UI object attribute information indicating that a plurality of UI objects are in the master/subordinate relationship is added to the UI object definition information included in the UI definition file. Thereby, it is possible to reduce possibility that the user forgets to select a necessary UI object or that the user selects unnecessary UI object by an incorrect operation.

When receiving selection of the UI objects as stated above, if the user does not select a UI object (No of step S15), the UI object selection processing unit 14 determines whether the operation to select the UI objects is finished (step S20). For example, if there is input to a soft key "OK" on the selection screen shown in FIG. 12(A) or on the preview screen shown in FIG. 12(B) by the user, it is determined that the operation to select the UI objects is finished. If the selecting operation of the UI objects is not finished at step S20, the UI object selection processing unit 14 returns to step S15 to receive further input to the input unit 22 by the user.

Figure 12:
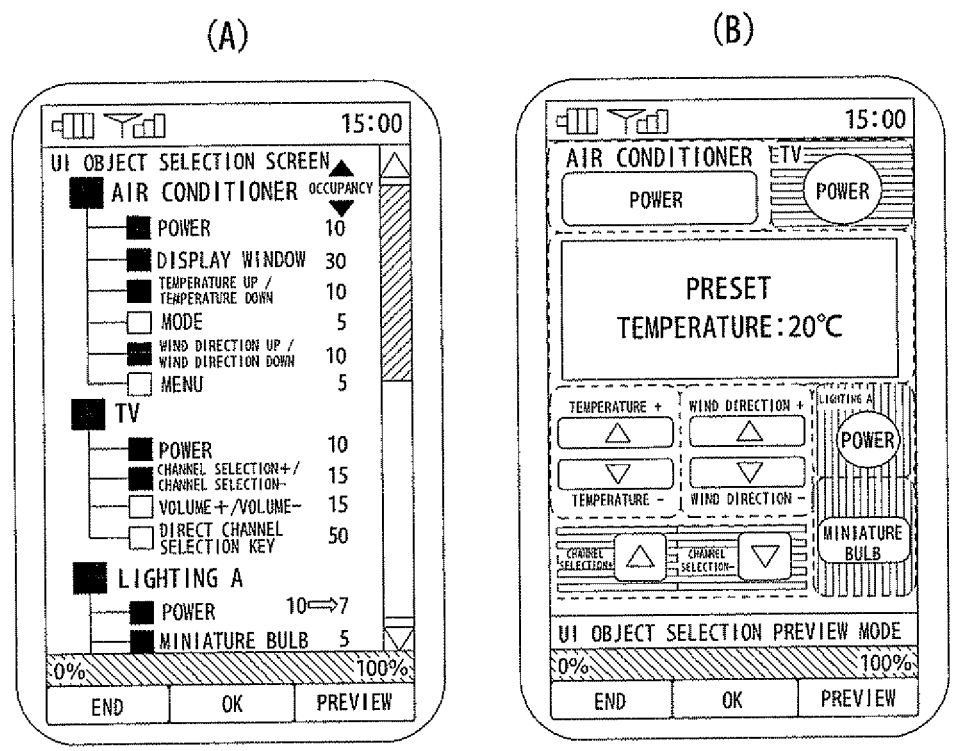
FIG. 12 is a diagram illustrating operations of the user interface object selection screen according to the present invention.

If the operation to select the UI objects is finished at step S20, the UI object selection processing unit 14 performs automatic layout processing with selected UI objects (step S21). If there is no instruction by the user, the UI objects are automatically arranged from top left in order of selection, in principle, so far as the UI display area permits. For example, if a plurality of UI objects is selected in series until the accumulated screen occupancy reaches 100% as shown in FIG. 12(A), the UI objects are arranged to fit in the UI display area of the display unit 24 in order of selection, in principle, as shown in FIG. 12(B). It is preferred not to left-align the UI objects simply but to arrange relevant UI objects collectively based on the UI object definition information and the like.

Even after automatic arrangement of the UI object, the user may suitably check current arrangement of the UI objects on the preview screen, as stated above. At this time also, arrangement of the UI objects can be changed in accordance with an operation to drag the input unit 22 by the user.

When layout of the selected UI objects is completed, the compound UI definition file generation unit 16 generates the compound UI definition file to define a plurality of compound UIs composed of the selected UI objects, based on the UI object definition information of the selected UI objects (step S22). The compound UI definition file generated is stored as a file in the XML form in the compound UI definition file memory area 56 of the memory unit 50. The file may be formed like the UI definition file of the XML form shown at the end of the present specification.

When the compound UI definition file is generated, the compound UI definition file generation unit 16 generates the relevant application information based on the selected UI objects of the compound UI (step S23). The relevant application information generated here is information to control applications relevant to UI objects when there is input to the UI objects selected for the compound UI. When the relevant application information is generated based on the selected UI objects, the compound UI definition file generation unit 16 associates the relevant application information with the compound UI definition file and stores the information in the relevant application information memory area 55 (step S24), and then ends overall processing to generate the compound UI.

Thereafter, it is possible to immediately use the compound UI once generated, by reading out the compound UI definition file stored in the compound UI definition file memory area 56.

The following is a method to generate the relevant application information corresponding to the compound UI definition file composed of the selected UI objects.

A first method to generate the relevant application information collects and uses information on applications included in respective UI definition files. That is, as shown in FIG. 13, the UI definition file includes information on application (application_used="tvremoconapp") which uses a UI generated based on the UI definition file. The control unit 10 collects information on the applications, which use the UIs generated based on the UI definition files, respectively, from the UI definition files of the UIs having the UI objects, which are selected as components of the compound UI, and generates relevant application information 55a of the compound UI, as shown in FIG. 2. The generated relevant application information 55a is associated with a corresponding compound UI definition file and then stored in the relevant application information store area 55.

A second method to generate the relevant application information collects and uses information on relevant applications from a list (table) stored in advance for administration of the UI for each application. That is, as shown in FIG. 14, a UI administration table for each application 57, in which each UI definition file and information of an application which uses the UI generated by the UI definition file are associated with each other, is stored in the memory unit 50 in advance. With reference to the UI administration table for each application 57, the control unit 10 collects the information on the applications corresponding to the UI definition files of the UIs, having the UI objects selected as components of the compound UI, as components and generates the relevant application information 55a of the compound UI as shown in FIG. 2. In this case also, the relevant application information 55a is associated with a corresponding compound UI definition file and then stored in the relevant application information memory area 55.

In addition, there may be a case in which a single application has a plurality of UIs. For example, "Calculator Application" has a normal calculator UI to which the most basic keys (UI object) for basic calculation, such as four arithmetic operations, are assigned and a functional calculator UI to which keys (UI object) for science and technology calculation, such as trigonometric function and power, are assigned. As these two UIs are provided switchably therebetween, it is possible to operate functions of the calculator application in accordance with the user's purpose. For example, in the UI administration table for each application 57 shown in FIG. 14, each information on application (application name) is associated with a type of the UI of the application (UI_code) and the UI definition file (the UI definition file name) of the UI. Here, the calculator application "calculatorapp" is associated with a normal calculator UI "Simple_Cal_UI" and a functional calculator UI "Function_Cal_UI" based on different UI definition files ("Simple_ calculator_interface.uiml" and "Function_calculator_interface.uiml"), respectively.

According to the present embodiment, as stated above, since it is possible to generate a single compound UI by adopting only the UI objects selected from the plurality of UN, the compound UI composed of only UI objects desired by the user can be provided. FIG. 12(B) is an exemplary diagram of a state in which layout of the compound UI is completed. In this example, a single compound UI is generated having only UI objects, necessary for the user in accordance with user's selection, from three kinds of UIs: the air conditioner remocon UI, the TV remocon UI and a lighting A UI.

Although overall processing to generate the compound UI is described as set forth above, in order to initiate and actually use the compound UI generated (prepared) as the compound UI definition file, it is necessary to display each UI object as a single compound UI on the display unit 24 and set the UI enabled. The following is a description of overall operation of the UI generation unit 13 when the mobile phone 1 displays and enables a normal UI or the compound UI according to the present embodiment.

Figure 15:
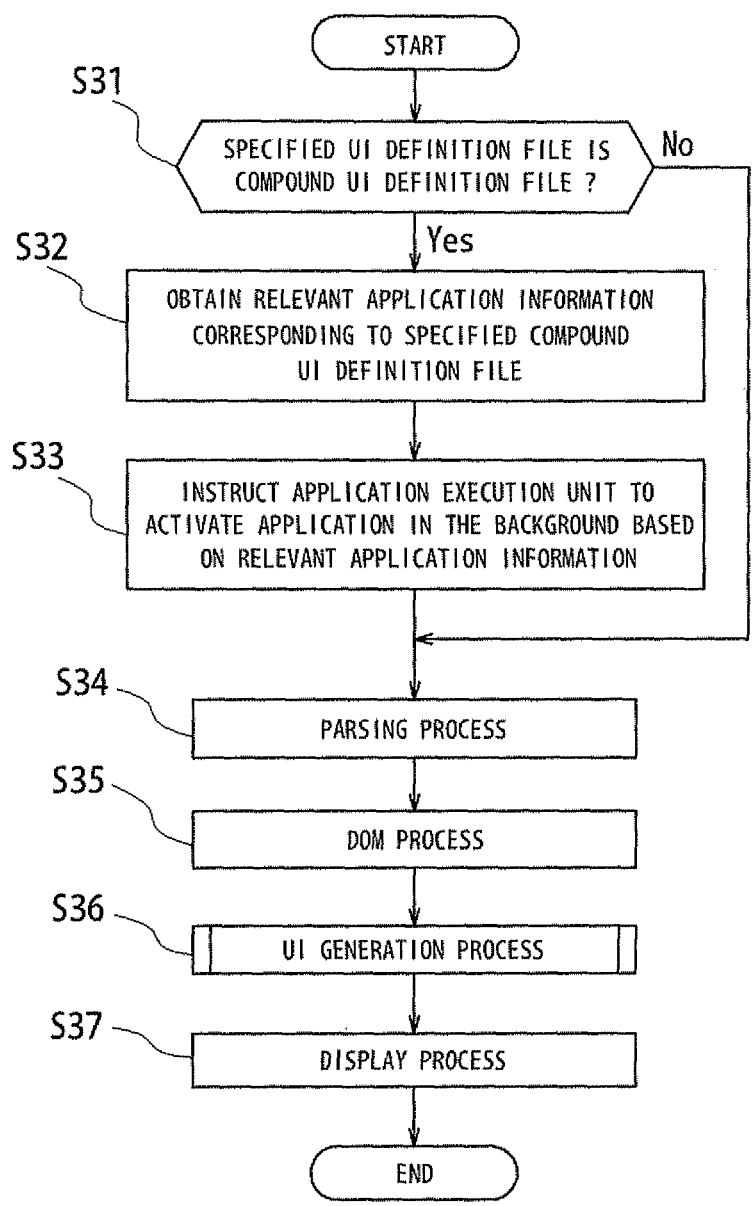
FIG. 15 is a flowchart illustrating processing by a user interface generation unit of the user interface generation apparatus according to the present invention.

FIG. 15 is a flowchart illustrating overall processing of the UI generation unit 13 to generate the UI from the UI definition file or the compound UI definition file and enable the UI. First, when the UI definition file (XML file) is specified from an application authorized to display the UI, based on input operation to the input unit 22 and the like by the user, processing to generate and enable the UI is started. Such application authorized to display the UI is not activated in the background of the mobile phone 1 but operating at the top of the applications.

Next, the UI generation unit 13 reads out specified UI definition file from the UI definition file memory area 52 or the compound UI definition file memory area 56 and determines whether the UI definition file is the compound UI definition file (step S31).

If it is determined that the specified file is the compound UI definition file, the UI generation unit 13 obtains the relevant application information stored in association with the target compound UI definition file from the relevant application information memory area 55 of the memory unit 50 (step S32). Next, based on the relevant application information obtained, the UI generation unit 13 instructs the application execution unit 11 to activate relevant applications in the background (step S33).

Then, the UI generation unit 13 performs XML parsing process (step S34) and DOM process (step S35) on the specified compound UI definition file. In addition, the UI generation unit 13 performs a UI generation processing based on the UI definition file on which parsing process and DOM process are performed (step S36). The UI generation processing is described below. Next, the UI generation unit 13 performs processing to display the UI in the UI display area of the display unit 24 of the touch panel 20 based on the UI of the XML file generated by the UI generation processing (step S37), and thereby the UI is enabled. Accordingly, the UI generation unit 13 and the compound UI definition file generation unit 16 together constitute a user interface generation unit in the present embodiment.

If it is determined that the specified file is not the compound UI definition file at step S31, the UI generation unit 13 returns to step S34 and thereafter performs the same processing as stated above. In this case, the UI definition file to be processed is not the compound UI definition file but the UI definition file for a single UI read out from the UI definition file memory area 52.

Next, the UI generation processing at step S36 in FIG. 15 is further described with reference to a flowchart shown in FIG. 16.

Figure 16:
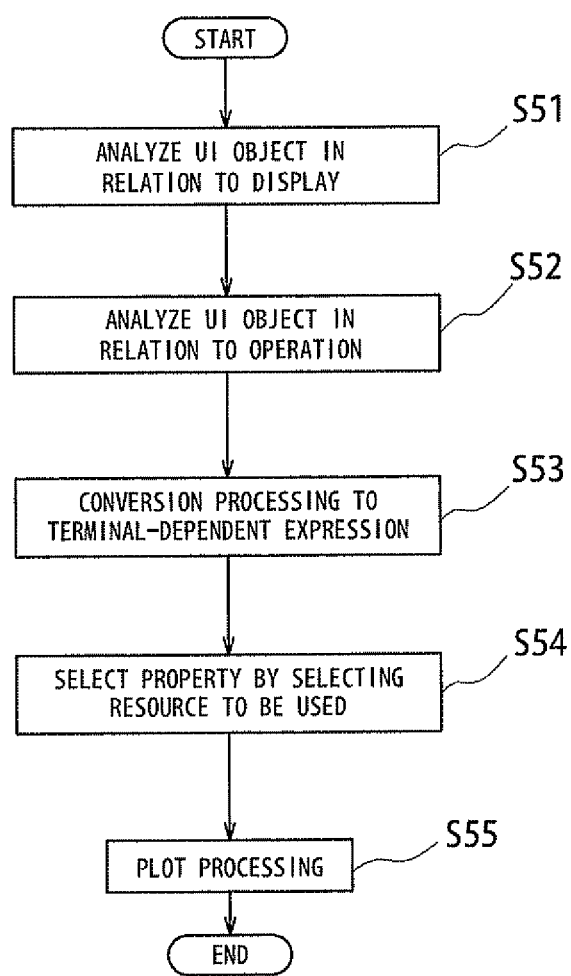
FIG. 16 is a flowchart further illustrating the user interface generation processing by the user interface generation unit of the user interface generation apparatus according to the present invention.

At start of the UI generation processing shown in FIG. 16, either the UI based on the single UI definition file or the compound UI based on the plurality of UI definition files is formed as a single DOM document (or DOM node). First, the UI generation unit 13 performs analysis in relation to display of the DOM document (step S51). For the UI definition file described in the UIML form, attributes with structure tag and style tag are analyzed. Next, the UI generation unit 13 performs analysis in relation to operation of the DOM document (step S52). For the UI definition file described in the UIML form, attribute with behavior tag and the like are analyzed.

Next, the UI generation unit 13 performs conversion processing of an expression included in the DOM document into a description dependent on each terminal (step S53). Moreover, the UI generation unit 13 selects a resource of the UI object to be used based on a result of the conversion processing at step S53 and sets each attribute (property) (step S54). The resource of the UI object necessary at this time is stored as the individual UI resource in the individual UI resource memory area 53 or as the common UI resource in the common UI resource memory area 54. Subsequently, the UI generation unit 13 performs plot processing of the UI including each UI object (step S55). Thereby, the UI generation processing ends and the UI generation unit 13 shifts to step S37 in FIG. 15 for UI display processing.

Thereby, it is possible to perform processing accordingly when the UI definition file specified in UI generation is either the compound UI definition file to compound a plurality of UIs or the UI definition file of the single UI, which does not compound a plurality of UIs. That is, if the compound UI definition file is processed, the application to compound a plurality of UIs is prepared and the compound UI is generated, whereas a single UI is generated in a conventional manner if the UI definition file of the single UI is processed.

Although the overall processing to generate and enable the UI by the UI generation unit 13 is described above, in order to actually initiate and use the compound UI generated in this manner, it is necessary to enable respective applications, corresponding to the UIs simultaneously used, simultaneously. Therefore, after reading out the compound UI definition file in the XML form from the compound UI definition file memory area 56 and initiating it, it is necessary to perform processing such as activation of each application, relevant to the compound UI, in the background.

Figure 17:
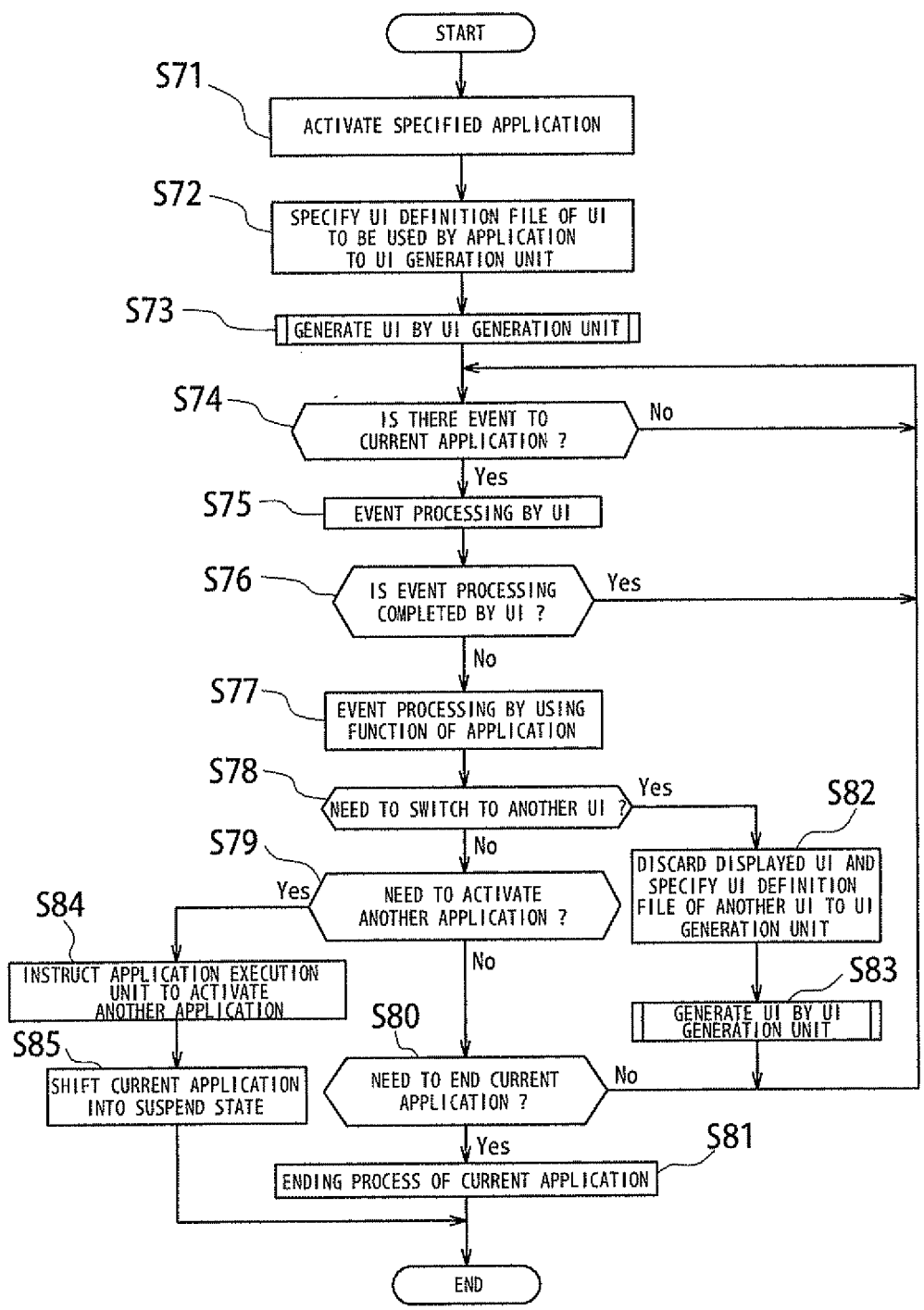
FIG. 17 is a flowchart illustrating overall processing performed when the user interface generation apparatus according to the present invention executes an application program alone.

For description of such processing, the following is a description of overall processing performed when there is only one application which receives instruction from the UI and such specified application is executed alone, with reference to a flowchart shown in FIG. 17.

When an application desired to initiate is specified by the user with input to the input unit 22 on a menu screen and the like, the application execution unit 11 reads out such specified application from the application memory area 51 and initiate it (step S71). Next, the application execution unit 11 specifies the UI definition file defining the UI, which is first used by the application activated (hereinafter, referred to as "current application" appropriately), to the UI generation unit 13 (step S72). The UI generation unit 13 reads out such specified UI definition file from the UI definition file memory unit 52, generates the UI based on the UI definition file read out and displays the UI on the display unit 24 (step S73). This processing to generate and enable the UI is performed based on the processing in the above description with reference to FIG. 15 and FIG. 16.

Then, the application execution unit 11 determines whether an event such as input operation to the input unit 22 by the user has been occurred to the UI displayed. If there is an event (Yes of step S74), the application execution unit 11 processes the event by the UI currently displayed (step S75). Subsequently, the application execution unit 11 determines whether processing of the event is completed only with the UI currently displayed (step S76). If the processing of the event is completed only with the UI currently displayed, the application execution unit 11 returns to step S74 to continue processing. However, if the event is not completed only with the UI currently displayed (No of step S76), the application execution unit 11 processes the event by using functions of the application (step S77).

For the process using the functions of the application at step S77, the application execution unit 11 determines whether there is a necessity to switch to another UI (step S78). If there is no such necessity, the application execution unit 11 determines whether there is a necessity to initiate another application (step S79). If there is no such necessity, the application execution unit 11 then determines whether there is a necessity to end the current application (step S80). If there is no such necessity, the application execution unit 11 returns to step S74 to continue processing. However, if it is determined that there is the necessity to end the current application at step S80, the application execution unit 11 performs ending process of the application (step S81). The ending process of the application includes processing to discard the UI currently displayed.

On the other hand, if it is determined that there is the necessity to switch to another UI, the application execution unit 11 discards the UI currently displayed and determines a next necessary UI for the current application. When the necessary UI is determined, the application execution unit 11 reads out the UI definition file defining the necessary UI from the UI definition file memory area 52 and specifies it to the UI generation unit 13 (step S82). Based on such specification, the UI generation unit 13 generates a new UI and displays it on the display unit 24 (step S83). Such generation of the new UI is also performed based on the processing described with reference to FIG. 15 and FIG. 16. After generating and displaying the new UI, the UI generation unit 13 returns to step S74 to continue processing.

In addition, if it is determined that there is the necessity to initiate another application at step S79, the application execution unit 11 determines and executes another application to be executed next (step S84). Moreover, the application execution unit 11, while executing such another application, shifts the current application into a suspend state (step S85).

Thereby, if only one application receives instruction from the UI, it is possible to continue operation of application even if an event across another UI or another application occurs, by shifting processing appropriately.

Figure 18:
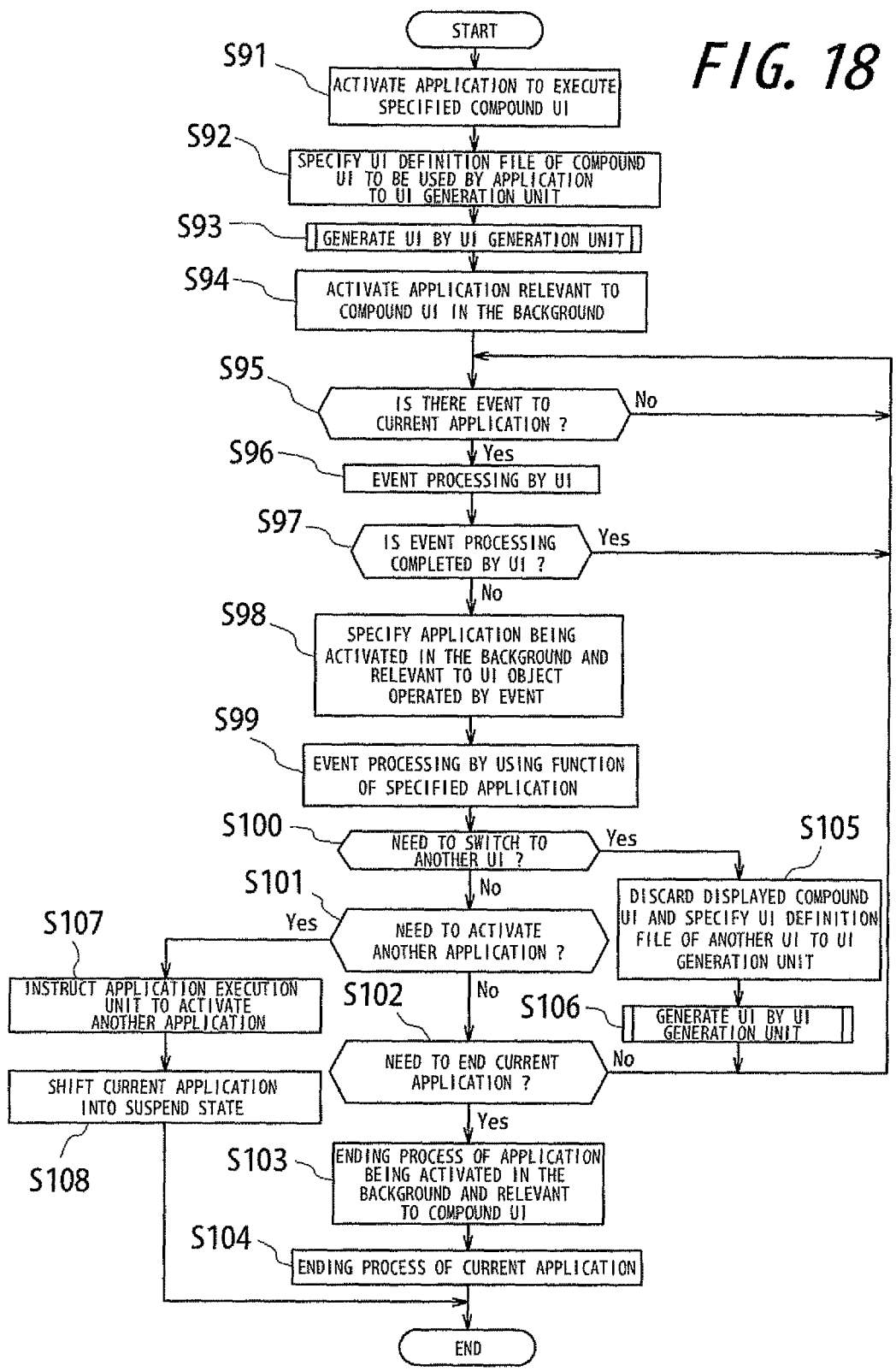
FIG. 18 is a flowchart illustrating overall processing performed when the compound user interface according to the present invention executes the application program.

Next, overall processing when a plurality of applications receives instruction from the compound UI, and a plurality of applications specified is executed, is described with reference to a flowchart shown in FIG. 18. The overall processing shown in FIG. 18 includes similar processing to that shown in FIG. 17, thus a description thereof is omitted appropriately.

First, the application execution unit 11 initiates an application (compound UI execution application) for executing the UI based on the compound UI definition file generated by the processing described with reference to FIG. 3 (step S91). Next, the application execution unit 11 specifies the compound UI definition file to be used by the compound UI execution application to the UI generation unit 13 (step S92). The UI generation unit 13 reads out such specified compound UI definition file from the compound UI definition file memory area 56 and, based on the compound UI definition file read out, generates the compound UI and displays it on the display unit 24 (step S93). While displaying the compound UI, the application execution unit 11 activates applications relevant to the compound UI in the background based on the relevant application information read out from the relevant application information memory area 55 (step S94).

Subsequently, the application execution unit 11 determines whether an event such as input operation to the input unit 22 by the user has been occurred on the compound UI displayed. If such event has been occurred (Yes of step S95), the application execution unit 11 processes the event with the compound UI currently displayed (step S96). After this, the application execution unit 11 determines whether the processing of the event is completed only with the compound UI currently displayed (step S97). If the event is completed only with the compound UI currently displayed, the application execution unit 11 returns to step S95 to continue processing. However, if the event is not completed only with the current compound UI (No of step S97), the application execution unit 11 specifies an application operated in the background, and relevant to the UI object operated by the event (step S98). Then, the application execution unit 11 performs event processing by using functions of the specified application (step S99).

If the event processing is performed by using the functions of the application at step S99, the application execution unit 11 determines whether there is a necessity to switch to another UI (step S100). If there is no such necessity, the application execution unit 11 determines whether there is a necessity to initiate another application (step S101). If there is no such necessity, the application execution unit 11 then determines whether there is a necessity to end the current application (step S102). If there is no such necessity, the application execution unit 11 returns to step S95 to continue processing. However, if it is determined that there is the necessity to end the current application at step S102, the application execution unit 11 performs ending process of the applications operated in the background and relevant to the compound UI being displayed (step S103) and then performs ending process of the current application (step S104). This ending process of the applications includes processing to discard the UI currently displayed. Other processing are the same as those in the description with reference to FIG. 17.

Thereby, when there is a plurality of applications which receives instructions from the compound UI, it is possible to continue operation of application by appropriate processing regardless of an event across another UI or another application.

It is to be understood that the present invention is not limited to the embodiments set forth above but may be modified or varied in a multiple manner. For example, the mobile terminal having the touch panel executes the UI compound processing in the above embodiment. However, the touch panel is not an essential element for the UI compound processing according to the present invention. The present invention may be applicable to a terminal with any input unit, such as numerous mechanical keys or a pointing device, for example, with which a user may compound UIs.

In addition, although the mobile phone 1 remotely controls the external equipments with infrared communication by the infrared communication unit 40 in the above embodiment, it is also possible to adopt Near Field Communication such as Bluetooth (registered trademark), wireless LAN and the like, for example, for communication with the external equipments.

Moreover, although the UI definition file of the UI corresponding to each application is stored in the UI definition file memory area 52 in advance in the above embodiment, it is also possible to obtain a necessary UI definition file externally as necessary. In this case, if the UI definition file is specified from the application using the UI, it is determined whether the necessary UI definition file is stored in the UI definition file memory area 52 or the compound UI definition file memory are 56. If the necessary UI definition file is not stored in the UI definition file memory area 52 or the compound UI definition file memory are 56, the UI obtaining unit 12 of the control unit 10 obtains the necessary UI definition file from external equipment or an external server (not shown) via the wireless communication unit 30.

Shown below are exemplary files in the UIML form based on XML as examples of the UI definition file used in each of the above embodiments. Underlined parts show additional UI object attribute information according to the present invention. In the examples, the UI object is defined by <template> tag, and thus a description between <template> and </template> corresponds to the UI object definition information.

First, an exemplary TV1_interface.uiml file is shown as the UI definition file constituting the TV remocon UI.

```
<?xml version="1.0" encoding="Shift_JIS"?>
<uiml>
    <interface id = "TV1_interface" particular name = "TV1">
        <structure>
            <part class="G:TopContainer" id="top">
            <part class="G:Image" id="bg"/>
            <part class="VBOX" id="vbox1">
                <part class="G:Area" id="a1" source="#t1_switch1" how="replace"/>
                <part class="G:Area" id="a6" source="#t1_10key" how="replace"/>
                <part class="HBOX" id="hbox1">
                    <part class="G:Area" id="a2" source="#t1_select_up" how="replace"/>
                    <part class="G:Area" id="a3" source="#t1_select_down" how="replace"/>
                </part>
                <part class="HBOX" id="hbox2">
                    <part class="G:Area" id="a4" source="#t1_volume_up" how="replace"/>
                    <part class="G:Area" id="a5" source="#t1_volume_down" how="replace"/>
                </part>
            </part>
            </part>
        </structure>
        <style>
            <property part-name="bg" name="image-src">TV_resorce_bg.jpg</property>
            <propetty part-name="header" name="g:location">0,0</property>
            <property part-name="header" name="g:size">240,400</property>
        </style>
        <behavior>
        </behavior>
```

```xml
</interface>
<template id = "t1_switch1" priority = "0">
        <part>
                        <part class="G:Button" id="switch1"/>
                <style>
                <property name="image-src">TV_resorce_switch1.jpg</property>
                <property name="g:text">Power</property>
                        <property name="g:size">30,30</property>
        </style>
        <behavior>
                <rule>
                        <condition>
                        <op name="and">
                                        <event class="KeyListener.g:keypressed"/>
                                        <op name="equal">
                                                <property event-class="KeyListener.g:keypressed" name="keyCode" />
                                                <constant value="57398" />
                                        </op>
                        </op>
                </condition>
                <action>
                                <call name="TVApp.on"/>
                </action>
                        </rule>
        </behavior>
                </part>
</template>
<template id = "t1_select_up" priority = "1" relate_id="select_1">
        <part>
                        <part class="G:Button" id="select_up"/>
                <style>
                <property name="image-src">TV_resorce_select_up.jpg</property>
                <property name="g:text">Channel Selection +</property>
                <property name="g:size">30,20</property>
        </style>
        <behavior>
                <rule>
                        <condition>
                        <op name="and">
                                        <event class="KeyListener.g:keypressed"/>
                                        <op name="equal">
                                                <property event-class="KeyListener.g:keypressed" name="keyCode" />
                                                <constant value="57399" />
                                        </op>
                        </op>
                </condition>
                <action>
                                <call name="TVApp.select_up"/>
                </action>
                        </rule>
        </behavior>
                </part>
</template>
<template id = "t1_select_down" priority = "1" relate_id="select_1">
        <part>
                        <part class="G:Button" id="select_down"/>
                <style>
                <property name="image-src">TV_resorce_select_down.jpg</property>
                <property name="g:size">30,20</property>
                <property name="g:text">Channel Selection -</property>
        </style>
        <behavior>
                <rule>
                        <condition>
                        <op name="and">
                                        <event class="KeyListener.g:keypressed"/>
                                        <op name="equal">
                                                <property event-class="KeyListener.g:keypressed" name="keyCode" />
                                                <constant value="57340" />
                                        </op>
                        </op>
                </condition>
                <action>
                                <call name="TVApp.select_down"/>
                </action>
                        </rule>
        </behavior>
                </part>
</template>
```

```xml
<template id = "t1_volume_up" priority = "1" relate_id="volume_1">
    <part>
        <part class="G:Button" id="volume_up"/>
        <style>
            <property name="image-src">TV_resorce_volume_up.jpg</property>
            <property name="g:size">20,30</property>
            <property name="g:text">Volume +</property>
        </style>
        <behavior>
            <rule>
                <condition>
                    <op name="and">
                        <event class="KeyListener.g:keypressed"/>
                        <op name="equal">
                            <property event-class="KeyListener.g:keypressed" name="keyCode" />
                            <constant value="57341" />
                        </op>
                    </op>
                </condition>
                <action>
                    <call name="TVApp.volume_up"/>
                </action>
            </rule>
        </behavior>
    </part>
</template>
<template id = "t1_volume_down" priority = "1" relate_id="volume_1">
    <part>
        <part class="G:Button" id="volume_down"/>
        <style>
            <property name="image-src">TV_resorce_volume_down.jpg</property>
            <property name="g:size">20,30</property>
            <property name="g:text">Volume -</property>
        </style>
        <behavior>
            <rule>
                <condition>
                    <op name="and">
                        <event class="KeyListener.g:keypressed"/>
                        <op name="equal">
                            <property event-class="KeyListener.g:keypressed" name="keyCode" />
                            <constant value="57342" />
                        </op>
                    </op>
                </condition>
                <action>
                    <call name="TVApp.volume_down"/>
                </action>
            </rule>
        </behavior>
    </part>
</template>
<template id = "t1_10key" priority = "3">
    <part>
        <part class="G:Image" id="10key"/>
        <style>
            <property name="image-src">TV_resorce_10key.jpg</property>
            <property name="g:text">Direct Channel Selection Key</property>
        </style>
        <behavior>
            <rule>
                <condition>
                    <event class="KeyListener.g:keypressed"/>
                </condition>
                <action>
                    <call name="TVApp.receiveKey">
                        <param>
                            <property event-class="KeyListener.g:keypressed" name="keyCode"/>
                        </param>
                    </call>
                </action>
            </rule>
        </behavior>
    </part>
</template>
<peers>
    <presentation base="XXX.uiml" />
    <logic id ="log1" source = "#t1_logic">
    </logic>
```

-continued

```
        </peers>
</uiml>
```

Next, the following is an exemplary AIR1_interface.uiml file as the UI definition file constituting the air conditioner remocon UI.

```
<?xml version="1.0" encoding="Shift_JIS"?>
<uiml>
        interface id = "AIR1_interface" particular name = "Air Conditioner Manufactured by X">
                <structure>
                        <part class="G:TopContainer" id="top">
                                <part class="G:Area" id="a1" source="#t1_switch2" how="replace"/>
                                <part class="G:Area" id="a2" source="#t1_wind_up" how="replace"/>
                                <part class="G:Area" id="a3" source="#t1_wind_down" how="replace"/>
                                <part class="G:Area" id="a4" source="#t1_set_up" how="replace"/>
                                <part class="G:Area" id="a5" source="#t1_set_down" how="relplace"/>
                                <part class="G:Area" id="a6" source="#t1_set_window" how="replace"/>
                                <part class="G:Area" id="a7" source="#t1_mode_change" how="replace"/>
                                <part class="G:Area" id="a8" source="#t1_menu" how="replace"/>
                                <part class="G:Image" id="bg"/>
                        </part>
                <structure>
                <style>
                        <property part-name="bg" name="image-src">AIR1_resorce_bg.jpg</property>
                        <property part-name="header" name="g:location">0,0</property>
                        <property part-name="header" name="g:size">240,400</property>
                </style>
        </interface>
        <template id = "t1_switch2" priority = "0">
                <part>
                        <part class="G:Button" id="switch2"/>
                <style>
                <property name="image-src">AIR1_resorce_switch2.jpg</property>
                <property name="g:size">30,30</property>
                <property name="g:text">Power</property>
                </style>
                <behavior>
                        <rule>
                                <condition>
                                        <op name="and">
                                                <event class="KeyListener.g:keypressed" />
                                                <op name="equal">
                                                        <property event-class="KeyListener.g:keypressed" name="keyCode" />
                                                        <constant value="57398" />
                                                </op>
                                        </op>
                                </condition>
                                <action>
                                        <call name="AIR1App.on"/>
                                </action>
                        </rule>
                </behavior>
                </part>
        </template>
        <template id = "t1_wind_up" priority = "5" relate_id="wind_1">
                <part>
                        <part class="G:Button" id="wind_up"/>
                <style>
                <property part-name="wind_up" name="image-src">AIR1_resorce_wind_up.jpg</property>
                        <property name="g:size">30,20</property>
                        <property name="g:text">Wind Direction +</property>
                <style>
                <behavior>
                        <rule>
                                <condition>
                                        op name="and">
                                                <event class="KeyListener.g:keypressed" />
                                                <op name="equal">
                                                        <property event-class="KeyListener.g:keypressed" name="keyCode" />
                                                        <constant value="57399" />
                                                </op>
                                        </op>
                                </condition>
                                <action>
                                        <call name="AIR1App.wind_up"/>
```

```xml
                            </action>
                        </rule>
                    </behavior>
                </part>
</template>
<template id = "t1_wind_down" priority = "5" relate_id="wind_1">
    <part>
            <part class="G:Button" id="wind_down"/>
        <style>
            <property name="image-src">AIR1_resorce_wind_down.jpg</property>
                <property name="g:size">30,20</property>
                <property name="g:text">Wind Direction-</property>
        </style>
        <behavior>
            <rule>
                    <condition>
                        <op name="and">
                            <event class="KeyListener.g:keypressed" />
                            <op name="equal">
                                <property event-class="KeyListener.g:keypressed" name="keyCode" />
                                <constant value="57340" />
                            </op>
                        </op>
                    </condition>
                    <action>
                        <call name="AIR1App.wind_down"/>
                    </action>
            </rule>
        </behavior>
    </part>
</template>
<template id = "t1_set_up" priority = "1" relate_id="set_1">
    <part>
            <part class="G:Button" id="set_up"/>
        <style>
            <property name="image-src">AIR1_resorce_set_up.jpg</property>
            <property name="g:size">20,30</property>
            <property name="g:text">Temperature +</property>
        </style>
        <behavior>
            <rule>
                    <condition>
                        <op name="and">
                            <event class="KeyListener.g:keypressed" />
                            <op name="equal">
                                <property event-class="KeyListener.g:keypressed" name="keyCode" />
                                <constant value="57341" />
                            </op>
                        </op>
                    </condition>
                    <action>
                        <call name="AIR1App.set_up"/>
                    </action>
            </rule>
        </behavior>
    </part>
</template>
<template id = "t1_set_down" priority = "1" relate_id="set_1">
    <part>
            <part class="G:Button" id="set_down"/>
        <style>
            <property name="image-src">AIR1_resorce_set_down.jpg</property>
            <property name="g:size">20,30</property>
            <property name="g:text">Temperature -</property>
        </style>
        <behavior>
            <rule>
                    <condition>
                        <op name="and">
                            <event class="KeyListener.g:keypressed"/>
                            <op name="equal">
                                <property event-class="KeyListener.g:keypressed" name="keyCode" />
                                <constant value="57342" />
                            </op>
                        </op>
                    </condition>
                    <action>
                        <call name="AIR1App.set_down"/>
                    </action>
```

-continued

```
                </rule>
        </behavior>
            </part>
</template>
<template id = "t1_set_window" priority = "0">
        <part>
                        <part class="G:Button" id="set_window"/>
                    <style>
                    <property name="image-src">AIR1_resorce_set_window.jpg</property>
                    <property name="g:size">20,30</property>
                    <property name="g:text">Preset Temperature</property>
                </style>
                <behavior>
                    <rule>
                            <condition>
                                    <op name="and">
                                            <event class="KeyListener.g:keypressed"/>
                                            <op name="equal">
                                                    <property event-class="KeyListener.g:keypressed" name="keyCode" />
                                                    <constant value="57343" />
                                            </op>
                                    </op>
                            </condition>
                            <action>
                                    <call name="AIR1App.set_window/">
                            <action>
                        </rule>
                </behavior>
                    <part>
</template>
<template id = "t1_mode_change" priority = "1">
        <part>
                        <part class="G:Button" id="mode"/>
                    <style>
                    <property name="image-src">AIR1_resorce_mode.jpg</property>
                    <property name="g:size">20,30<property>
                </style>
                <behavior>
                    <rule>
                            <condition>
                                    <op name="and">
                                            <event class="KeyListener.g:keypressed" />
                                            <op name="equal">
                                                    <property event-class="KeyListener.g:keypressed" name="keyCode" />
                                                    <constant value="57344" />
                                            </op>
                                    </op>
                            </condition>
                            <action>
                                    <call name="AIR1App.mode_change"/>
                            </action>
                        </rule>
                </behavior>
                    </part>
</template>
<template id = "t1_menu" priority = "5">
        <part>
                        <part class="G:Button" id="menu"/>
                    <style>
                    <property name="image-src">AIR1_resorce_menu.jpg</property>
                    <property name="g:size">20,30</property>
                </style>
                <behavior>
                    <rule>
                    <condition>
                            <op name="and">
                                    <event class="KeyListener.g:keypressed" />
                                    <op name="equal">
                                            <property event-class="KeyListener.g:keypressed" name="keyCode" />
                                            <constant value="57345" />
                                    </op>
                            <op>
                    </condition>
                    <action>
                            <call name="AIR1App.menu"/>
                    </action>
                    </rule>
                </behavior>
                    <part>
```

```
        </template>
        <peers>
                <presentation base="XXX.uiml" />
                <logic id ="log1" source = "#t2_logic">
                </logic>
        </peers>
</uiml>
```

Next, the following is an exemplary light1_interface.uiml file as the UI definition file constituting a lighting remocon UI.

```
<?xml version="1.0" encoding="Shift_JIS"?>
<uiml>
    <interface id = "light1_interface" particular name = "Lighting 1">
            <structure>
                    <part class="G:TopContainer" id="top">
                    <part class="G:Image" id="bg"/>
                    <part class="VBOX" id="vbox1">
                            <part class="G:Area" id="a1" source="#t1_switch3" how="union"/>
                            <part class="HBOX" id="hbox1">
                                    <part class="G:Area" id="a2" source="#t1_mame_den" how="replace"/>
                                    <part class="G:Area id="a3" source="#t1_timer " how="replace"/>
                            </part>
                    </part>
                    </part>
            </structure>
            <style>
                    <property part-name="bg" name="image-src">TV_resorce_bg.jpg</property>
                    <property part-name="header" name="g:location">0,0</property>
                    <property part-name="header" name="g:size">240,400</property>
            </style>
            <behavior>
            </behavior>
    </interface>
    <template id "t1_switch3" priority = "0">
            <part>
                    <part class="G:Button" id="switch3"/>
            <style>
            <property name="image-src">Light1_resorce_switch3.jpg</property>
            <property name="g:text">Power</property>
                    <property part-name="switch1" name="g:size">30,30</property>
            <style>
            <behavior>
                <rule>
                    <condition>
                        <op name="and">
                            <event class="KeyListener.g:keypressed"/>
                            <op name="equal">
                                    <property event-class="KeyListener.g:keypressed" name="keyCode" />
                                    <constant value="57398" />
                            </op>
                        </op>
                    <condition>
                    <action>
                        <call name="Light1App.on"/>
                    </action>
                    </rule>
            </behavior>
            </part>
    </template>
    <template id = " t1_mame_den "/>
            <part>
                    <part class="G:Button" id="mame_den"/>
            <style>
            <property names="image-src">Light1_resorce_mameden.jpg</property>
            <property name="g:text">Miniature Bulb</property>
                    <property part-name="select_up" name="g:size">30,20</property>
            </style>
            <behavior>
                <rule>
                    <condition>
                        <op name="and">
                            <event class="KeyListener.g:keypressed"/>
                            <op name="equal">
                                    <property event-class="KeyListener.g:keypressed" name="keyCode" />
```

```
                            <constant value="57399" />
                    </op>
                </op>
            </condition>
            <action>
                <call name=" Light1App.mame"/>
            </action>
        </rule>
    </behavior>
        </part>
</template>
<template id = "t1_select_down" priority ="1" relate_id="switch3">
        <part>
                <part class="G:Button" id="timer"/>
        <style>
        <property name="image-src">TV_resorce_select_down.jpg</property>
        <property name="g:size">30,20</property>
        <property name="g:text">Timer OFF</property>
    </style>
    <behavior>
        <rule>
            <condition>
                <op name="and">
                    </event class="KeyListener.g:keypressed"/>
                    <op name="equal">
                        <property event-class="KeyListener.g:keypressed" name="keyCode" />
                        <constant value="57340" >
                    </op>
                </op>
            </condition>
            <action>
                <call name="TVApp.select_down"/>
            </action>
        </rule>
    </behavior>
        </part>
</template>
<peers>
        <presentation base="XXX.uiml" />
        <logic id ="log1" source ="#t1_logic">
        </logic>
</peers>
</uiml>
```

Furthermore, the following is an extracted part of an exemplary comp1.uiml file as the compound UI definition file defining a compound UI, composed of the selected UI objects, generated based on the UI object definition information of the UI object selected from a plurality of UIs, as described with reference to FIG. 3.

```
<?xml version="1.0" encoding="Shift_JIS"?>
<uiml>
        <interface id = "comp1_interface" particular name = "Compound UI 1">
                <structure>
                        <part class="G:TopContainer" id="top">
                        <part class="G:Image" id="bg"/>
                        <part class="VBOX" id="vbox1">
                            <part class="HBOX" id="hbox1">
                                <part class="G:Area" id="a1" source=#"t1_comp1(1)" how="union "/>
                                <part class="G:Area" id="a2" source=#t1_comp1(2) " how=" union "/>
                            </part>
                            <part class="HBOX" id="hbox2">
                                <part class="G:Area" id="a3" source=#t1_comp1(3)" how=" union "/>
                            </part>
                            <part class="HBOX" id="hbox3">
                                <part class="G:Area" id="a4" source="#t1_comp1(4)" how="union"/>
                                <part class="G:Area" id="a5" source="#t1_comp1(5)" how="union"/>
                                <part class="G:Area" id="a6" source="#t1_comp1(6)" how="union"/>
                            </part>
                            <part class="HBOX" id="hbox4">
                                <part class="G:Area" id="a7" source="#t1_comp1(7)" how="union"/>
                                <part class="G:Area" id="a8" source="#t1_comp1(8)" how="union"/>
                                <part class="G:Area" id="a9" source="#t1_comp1(9)" how="union"/>
                            </part>
                        </part>
                        </part>
                </structure>
                <style>
```

-continued

```
                <property part-name="bg" name="image-src">comp_commonbg.jpg</property>
                <property part-name="header" name="g:Location">0,0<property>
                <property part-name="header" name="g:size">240,400</property>
        </style>
    </interface>
    <template id = " t1_comp1(1)" >
        <part>
                <part class="G:Button" id="switch2" particular_name= Air Conditioner Manufactured By X"/>
        <style>
        <property part-name="t1_comp1(1)_switch2" name="image-src">AIR1_resorce_switch2.jpg</property>
        <property part-name="t1_comp1(1)_switch2" name="g:size">30,30</property>
        <property part-name="t1_comp1(1)_switch2" name="g:text">Power</property>
        </style>
        <behavior>
            <rule>
                <condition>
                    <op name="and">
                        <event class="KeyListener.g:keypressed" />
                        <op name="equal">
                            <property event-class="KeyListener.g:keypressed" name="keyCode" />
                            <constant value="57398" />
                        </op>
                    </op>
                </condition>
                <action>
                    <call name="AIR1App.on"/>
                </action>
            <rule>
        </behavior>
        </part>
</template>
<template id ="t1_comp1(2)"/>
    <part>
                <part class="G:Button" id="switch1" particular_name="TV1"/>
        <style>
        <property part-name="t1_comp1(2)_switch2" name="image-src">TV_resorce_switch1.jpg</property>
        <property part-name="t1_comp1(2)_switch2" name="g:text">Power</property>
        <property part-name="t1_comp1(2)_switch2" name="g:size">30,30</property>
        </style>
        <behavior>
            <rule>
                <condition>
                <op name="and">
                        <event class="KeyListener.g:keypressed" part-name="t1_comp1(2)_switch2/ >
                        <op name="equal">
                            <property event-class="KeyListener.g:keypressed" name="keyCode" />
                            <constant value="57398" />
                        </op>
                </op>
                </condition>
                <action>
                    <call name="TVApp.on"/>
                </action>
                </rule>
        </behavior>
        </part>
    </template>
                        (The rest is omitted...)
<peers>
    <presentation base="XXX.uiml" />
    <logic id ="log1" source = "#t1_logic">
    </logic>
</peers>
</uiml>
```

INDUSTRIAL APPLICABILITY

According to the present invention, in order to compound a plurality of UN, it is possible to generate a single compound UI which adopts only selected UI objects and fits in a predetermined UI display area. Accordingly, the compound UI is composed of only UI objects desired by the user, omitting all unnecessary UI objects. The compound UI generated in this manner enables concurrent use of the plurality of UIs without switching therebetween. Moreover, unlike multi-window, since there is no need of operations to select the display area (window) and move a scroll bar in the display area, it significantly reduces operational load for the user.

The invention claimed is:

1. A user interface generation apparatus comprising: an application program execution unit, implemented by a processor, for implementing a variety of functions based on an application program; a user interface generation unit, implemented by the processor, for generating a user interface for instructing the application program execution unit to execute a predetermined function based on the application program;

a memory for storing a user interface definition file including user interface object definition information for defining one or more input components of the user interface; and a selection screen generation unit, implemented by the processor, for generating a selection screen (i) for receiving a selection of one or more input components of at least a first user interface and (ii) for receiving a selection of one or more input components of a second user interface of a plurality of application programs based on the user interface object definition information, wherein each of the one or more input components of the first and second user interfaces corresponds to an user interface object that is displayed in the selection screen and available for selection, and wherein:

the selection screen generation unit, if it is instructed to compound user interfaces of a plurality of application programs, generates the selection screen based on the user interface object definition information included in the user interface definition file stored in the memory corresponding to, at least, each of the first and second user interfaces of the plurality of application programs, the user interface generation unit generates a compound user interface definition file including user interface object definition information of the one or more input components that were selected from each of the first and second user interfaces of the plurality of application programs provided by the selection screen, and generates a compound user interface based on the compound user interface definition file, wherein the compound user interface comprises (i) the one or more input components selected from the first user interface and (ii) the one or more input components selected from the second user interface of the plurality of application programs selected in the selection screen, and a screen occupancy accumulation unit, implemented by the processor, that determines a total screen occupancy value by calculating a total of ratios of areas occupied by the user interface objects associated with each of the one or more input components selected in a predetermined user interface display area based on user interface object attribute information associated with each of the selected user interface objects, wherein a screen occupancy value of each of the selected user interface objects in the predetermined user interface display area is included in the user interface object attribute information in the user interface definition file for each user interface object, wherein the selection screen generation unit:

(i) provides, during the selection of the interface objects, a visual display element representing the total screen occupancy value comprising a sum of the screen occupancy value of each of the selected user interface objects, (ii) updates the total screen occupancy value of the visual display element based on a selection of one of the user interface objects, (iii), if the total screen occupancy value of the compound user interface accumulated by the screen occupancy accumulation unit exceeds a predetermined value, displays the total screen occupancy value exceeding the predetermined value and cancels selection of the user interface object selected that caused the total screen occupancy value to exceed the predetermined value and informs that the user interface object cannot be selected.

2. The user interface generation apparatus according to claim 1, wherein the user interface object definition information includes user interface object attribute information including information indicating a relationship between the user interface object and another user interface object composing the user interface which includes the user interface object as a component, and the user interface generation unit, if it is instructed to compound the plurality of user interfaces, determines an arrangement of the user interface objects of the compound user interface based on the user interface object attribute information of the user interface objects selected on the selection screen and identification information of user interfaces to which the user interface objects belong.

3. The user interface generation apparatus according to claim 1, wherein the memory stores the compound user interface definition file generated based on the user interface objects selected on the selection screen, and the application program execution unit, when activating the compound user interface based on the compound user interface definition file stored in the memory, activates a corresponding application program in a background based on relevant application program information specifying an application program corresponding to each user interface object composing the compound user interface.

4. The user interface generation apparatus according to claim 2, wherein the memory stores the compound user interface definition file generated based on the user interface objects selected on the selection screen, and the application program execution unit, when activating the compound user interface based on the compound user interface definition file stored in the memory, activates a corresponding application program in a background based on relevant application program information specifying an application program corresponding to each user interface object composing the compound user interface.

5. A user interface generation apparatus comprising: an application program execution unit, implemented by the processor, for implementing a variety of functions based on an application program; a user interface generation unit, implemented by the processor, for generating a user interface for instructing the application program execution to execute a predetermined function based on the application program; a memory for storing a user interface definition file including user interface object definition information for defining a user interface object, which is a component of the user interface; and a selection screen generation unit, implemented by the processor, for generating a selection screen (i) for receiving a selection of user interface objects of a first user interface and (ii) for receiving a selection of user interface objects of a second user interface, wherein the first user interface and the second user interface are, respectively, based on one of a plurality of application programs, and wherein each of the user interface objects of the first user interface and the second user interface corresponds to an user interface object that is displayed in the selection screen and available for selection, and wherein: the screen generation unit, if it is instructed to compound user interfaces of a plurality of application programs, generates the selection screen based on the user interface object definition information included in the user interface definition file stored in the memory corresponding to, at least, each of the first and second user interfaces of the plurality of application programs, and the user interface generation unit generates a compound user interface definition file including user interface object definition information of user interface objects that were selected from the first and second user interfaces on the selection screen, and generates a compound user interface based on the compound user interface definition file, wherein the compound user interface is a single user interface comprising (i) the user interface objects selected from the first user interface and (ii) the user interface objects selected from the second user interface in the selection screen, wherein the user interface objects are components of the first and second user interfaces of the plurality of application programs, wherein the user interface objects that were selected are components which from parts of the compound user interface after executing an application which generates the compound user interface; and a screen occupancy accumulation unit, implemented by the processor, that determines a total screen occupancy value by calculating a total of ratios of areas occupied by the selected user interface objects in a predetermined user interface display area based on the user interface object attribute information associated with each of the selected user interface objects, wherein a screen occupancy value of each of the selected user interface objects in the predetermined user interface display area is included in the user interface attribute information in the user interface definition file for each of the selected user interface objects, wherein the selection screen generation unit:
  (i) provides, during the selection of the interface objects, a visual display element representing the total screen occupancy value comprising a sum of the screen occupancy value of each of the selected user interface objects,
  (ii) updates the total screen occupancy value of the visual display element based on a selection of one of the user interface objects,
  (iii), if the total screen occupancy value of the compound user interface accumulated by the screen occupancy accumulation unit exceeds a predetermined value, displays the total screen occupancy value exceeding the predetermined value and cancels selection of the user interface object selected that caused the total screen occupancy value to exceed the predetermined value and informs that the user interface object cannot be selected.

6. The user interface generation apparatus according to claim 1, wherein the selection screen generation unit displays, on the selection screen, the first user interface and the second user interface, wherein the first user interface and the second user interface are based on different application programs of the plurality of application programs.

7. A user interface generation apparatus comprising: an application program execution unit, implemented by the processor, for implementing a variety of functions based on an application program; a user interface generation unit, implemented by the processor, for generating a user interface for instructing the application program execution unit to execute a predetermined function based on the application program; a memory for storing a user interface definition file including user interface object definition information for defining one or more input components of a user interface; a selection screen generation unit, implemented by the processor, for generating a selection screen for receiving selection of the one or more input components of the user interface based on the user interface object definition information, wherein:
  the selection screen generation unit, if it is instructed to compound user interfaces of a plurality of application programs, generates the selection screen based on the user interface object definition information included in the user interface definition file stored in the memory corresponding to each of the user interfaces of the plurality of application programs,
  and the user interface generation unit generates a compound user interface definition file including user interface object definition information of the one or more input components of each user interface of the plurality of application programs selected on the selection screen, and generates a compound user interface based on the compound user interface definition file, wherein the compound user interface is composed of the one or more input components of each user interface of the plurality of application programs selected in the selection screen; and a screen occupancy accumulation unit, implemented by the processor, that determines a total screen occupancy value by calculating a total of ratios of areas occupied by the selected user interface objects in a predetermined user interface display area based on the user interface object attribute information associated with each of the selected user interface objects, wherein a screen occupancy value of each of the selected user interface objects in the predetermined user interface display area is included in the user object interface attribute information in the user interface definition file for each user interface object, wherein the selection screen generation unit:
  (i) provides, during the selection of the interface objects, a visual display element representing the total screen occupancy value comprising a sum of the screen occupancy value of each of the selected user interface objects,
  (ii) updates the total screen occupancy value of the visual display element based on a selection of one of the user interface objects,
  (iii), if the total screen occupancy value of the compound user interface accumulated by the screen occupancy accumulation unit exceeds a predetermined value, displays the total screen occupancy value exceeding the predetermined value and cancels selection of the user interface object selected that caused the total screen occupancy value to exceed the predetermined value and informs that the user interface object cannot be selected.

8. The user interface generation apparatus according to claim 1, wherein the user interface generation unit determines whether to adopt the user interface objects in pairs.

9. The user interface generation apparatus according to claim 1, wherein the visual display element comprises a bar chart of the accumulated screen occupancy value.

10. The user interface generation apparatus according to claim 9, wherein the user interface generation unit changes the accumulated screen occupancy value displayed with the bar chart in accordance with the change of the selection of the user interface object.

11. The user interface generation apparatus according to claim 1, wherein the user interface generation unit displays the accumulated screen occupancy value with the user interface object.

12. The user interface generation apparatus according to claim 1, wherein the user interface generation unit displays a range in which the accumulated screen occupancy value may be adjusted.

13. The user interface generation apparatus according to claim 1, wherein the user interface generation unit allows, when a predetermined user interface object is selected, a selection of a user interface object subordinate to the predetermined user interface object.

* * * * *